(12) United States Patent
Park et al.

(10) Patent No.: US 12,684,215 B2
(45) Date of Patent: Jul. 14, 2026

(54) CAMERA MODULE AND ELECTRONIC DEVICE INCLUDING THE SAME

(71) Applicant: SAMSUNG ELECTRONICS CO., LTD., Suwon-si (KR)

(72) Inventors: Chiyoung Park, Suwon-si (KR); Manho Kim, Suwon-si (KR); Youngsoo Jang, Suwon-si (KR); Bongchan Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 36 days.

(21) Appl. No.: 18/784,469

(22) Filed: Jul. 25, 2024

(65) Prior Publication Data

US 2025/0039525 A1     Jan. 30, 2025

Related U.S. Application Data

(63) Continuation of application No. PCT/KR2024/095843, filed on May 22, 2024.

(30) Foreign Application Priority Data

Jul. 28, 2023    (KR) ........................ 10-2023-0098906
Aug. 24, 2023    (KR) ........................ 10-2023-0111238

(51) Int. Cl.
*H04N 23/55*      (2023.01)
*H04N 23/51*      (2023.01)
       (Continued)

(52) U.S. Cl.
CPC ............. *H04N 23/55* (2023.01); *H04N 23/51* (2023.01); *H04N 23/57* (2023.01); *H04N 23/68* (2023.01)

(58) Field of Classification Search
CPC ........ H04N 23/51; H04N 23/54; H04N 23/55; H04N 23/57; H04N 23/68
See application file for complete search history.

(56) References Cited

U.S. PATENT DOCUMENTS

2007/0077805 A1*   4/2007   Nomura ................. H04N 23/68
                                      348/E5.046
2009/0201399 A1*   8/2009   Senga .................. H04N 23/685
                                       348/374

(Continued)

FOREIGN PATENT DOCUMENTS

JP     2012-235509 A    11/2012
JP        5115494 B2    1/2013
(Continued)

OTHER PUBLICATIONS

International Search Report (PCT/ISA/210) issued by the International Searching Authority on Aug. 28, 2024 in corresponding International Application No. PCT/KR2024/095843.
(Continued)

*Primary Examiner* — Amy R Hsu
(74) *Attorney, Agent, or Firm* — Sughrue Mion, PLLC

(57) ABSTRACT

Disclosed is a camera module including a lens that includes an optical axis, a lens housing to accommodate the lens, an image sensor to receive light passing through the lens, a connector to receive an electrical signal from the image sensor, and a flexible printed circuit board to connect the image sensor and the connector. The FPCB changes between a first configuration in which the FPCB extends substantially linearly between the image sensor and the connector, and a second configuration in which the FPCB has at least three bent areas, at least two folded areas, and at least two side areas along a perimeter of the image sensor.

20 Claims, 21 Drawing Sheets

(51) Int. Cl.
    *H04N 23/57*       (2023.01)
    *H04N 23/68*       (2023.01)

(56)           References Cited

U.S. PATENT DOCUMENTS

| | | | |
|---|---|---|---|
| 2014/0285678 A1* | 9/2014 | Jeong | G02B 27/646 |
| | | | 348/208.7 |
| 2021/0223563 A1* | 7/2021 | Miller | G02B 27/646 |
| 2022/0329712 A1* | 10/2022 | Wang | H05K 1/0277 |
| 2023/0069902 A1* | 3/2023 | Miller | H04N 23/57 |

FOREIGN PATENT DOCUMENTS

| | | |
|---|---|---|
| JP | 6959777 B2 | 11/2021 |
| KR | 10-2003043 B1 | 7/2019 |
| KR | 10-2022-0145735 A | 10/2022 |
| KR | 10-2023-0041585 A | 3/2023 |
| WO | 2021/061563 A1 | 4/2021 |

OTHER PUBLICATIONS

Written Opinion (PCT/ISA/237) issued by the International Searching Authority on Aug. 28, 2024 in corresponding International Application No. PCT/KR2024/095843.

* cited by examiner

CAMERA MODULE AND ELECTRONIC DEVICE INCLUDING THE SAME

CROSS-REFERENCE TO RELATED APPLICATIONS

This application is a continuation application of International Application No. PCT/KR2024/095843 designating the United States, filed on May 22, 2024, in the Korean Intellectual Property Receiving Office and claiming priority to Korean Patent Application No. 10-2023-0098906, filed on Jul. 28, 2023, in the Korean Intellectual Property Office, and Korean Patent Application No. 10-2023-0111238, filed on Aug. 24, 2023, in the Korean Intellectual Property Office, the disclosures of which are incorporated by reference herein in their entireties.

BACKGROUND

1. Field

The disclosure relates to a camera module, for example, to a camera module configured to stabilize an image. The disclosure also relates to an electronic device including a camera module.

2. Description of Related Art

An image stabilizer may be used to eliminate the effect of shakes on an image when capturing an object. For example, the image stabilizer may use a method of shifting at least one lens, a method of shifting an optical system (e.g., a prism or a mirror), or a method of shifting a module.

The above description is informative and is not necessarily art publicly known at the time the present application was filed.

SUMMARY

According to an aspect of the disclosure, there is provided a camera module including: a lens including an optical axis; a lens housing configured to accommodate the lens; an image sensor configured to receive light passing through the lens; a connector configured to receive an electrical signal from the image sensor; and a flexible printed circuit board (FPCB) configured to connect the image sensor and the connector, wherein the FPCB is configured to change between a first configuration in which the FPCB is configured to extend substantially linearly between the image sensor and the connector, and a second configuration in which the FPCB has at least three bent areas, at least two folded areas, and at least two side areas along a perimeter of the image sensor.

The FPCB may include: a first bent area connected to the image sensor and configured to bend in a first direction with respect to the image sensor; a first folded area configured to fold in a second direction that is substantially orthogonal to the first direction with respect to the first bent area; a first side area connected to the first folded area and configured to extend in the second direction along the perimeter of the image sensor; a second bent area connected to the first side area and configured to bend in a third direction that is substantially orthogonal to each of the first direction and the second direction; a second side area connected to the second bent area and configured to extend in the third direction along the perimeter of the image sensor; a second folded area connected to the second side area and configured to fold in a fourth direction that is opposite to the first direction; and a third bent area connected to the second folded area, the third bent area being configured to bend toward the connector, and configured to connect to the connector.

The first side area and the second side area may be on a plane that is different from the plane on which the image sensor is provided.

The camera module may further include an actuator configured to apply a force to the first side area and/or the second side area.

The FPCB further may include: a fourth bent area connected to the second side area and is configured to bend in a fifth direction that is opposite to the second direction; and a third side area connected to the fourth bent area and the second folded area, and configured to extend in the fifth direction along the perimeter of the image sensor.

The FPCB may include a first FPCB and a second FPCB.

The first FPCB and the second FPCB may be symmetrically arranged relative to each other with respect to a plane including the optical axis.

The FPCB further may include: a first base area configured to connect the image sensor and the first bent area; and/or a second base area configured to connect the third bent area and the connector.

The first folded area may be configured to fold inward and/or outward, and the second folded area may be configured to fold inward and/or outward.

The first folded area and the second folded area have curvatures configured to fold without cracking the FPCB.

The FPCB further may include a reinforcing portion provided in at least one of the first bent area, the second bent area, or the third bent area.

The camera module may include a camera housing configured to support at least one of the first bent area, the second bent area, or the third bent area.

The FPCB further may include a hardened bonding and/or a fixing portion provided in the first folded area or the second folded area.

The camera module may include a carrier configured to carry the lens housing, the carrier being provided between the lens housing and the image sensor.

The FPCB further may include: a fourth bent area configured to connect to the second side area and configured to bend in a fifth direction that is opposite to the second direction; a third side area configured to connect to the fourth bent area and configured to extend in the fifth direction along the perimeter of the image sensor; a fifth bent area configured to connect to the third side area and configured to bend in a sixth direction that is opposite to the third direction; a fourth side area configured to connect to the fifth bent area and configured to extend in the sixth direction along the perimeter of the image sensor; a sixth bent area configured to connect to the fourth side area and configured to bend in the second direction; and a fifth side area configured to connect to the sixth bent area and the second folded area and configured to extend in the second direction.

The fifth side area at least partially overlaps the first side area.

The FPCB further may include a third folded area configured to connect to the image sensor and the first bent area and configured to fold in a direction that is substantially orthogonal to each of the first direction and the second direction.

The camera module may be included in an electronic device.

According to an aspect of the disclosure, there is provided a camera module including: a lens comprising an optical axis; a lens housing configured to accommodate the lens; an image sensor configured to receive light passing through the lens; a connector configured to receive an electrical signal from the image sensor; and a flexible printed circuit board (FPCB) configured to connect the image sensor and the connector, wherein the FPCB includes: a first bent area configured to connect to the image sensor and configured to bend in a first direction with respect to the image sensor; a first folded area configured to fold in a second direction that is substantially orthogonal to the first direction with respect to the first bent area; a first side area configured to connect to the first folded area and configured to extend in the second direction along a perimeter of the image sensor; a second bent area configured to connect to the first side area and configured to bend in a third direction that is substantially orthogonal to each of the first direction and the second direction; a second side area configured to connect to the second bent area and configured to extend in the third direction along the perimeter of the image sensor; a second folded area configured to connect to the second side area and configured to fold in a fourth direction that is opposite to the first direction; and a third bent area configured to connect to the second folded area, the third bent area being configured to bend toward the connector, and configured to connect to the connector.

According to an aspect of the disclosure, there is provided a camera module including: a lens comprising an optical axis; a lens housing configured to accommodate the lens; an image sensor configured to receive light passing through the lens; a connector configured to receive an electrical signal from the image sensor; and a flexible printed circuit board (FPCB) configured to connect the image sensor and the connector, wherein the FPCB includes: a first bent area configured to connect to the image sensor and bent in a first direction with respect to the image sensor; a first folded area configured to connect to the first bent area and configured to fold in a second direction that is substantially orthogonal to the first direction; a first side area configured to connect to the first folded area and configured to extend in the second direction along a perimeter of the image sensor; a second bent area configured to connect to the first side area and configured to bend in a third direction that is substantially orthogonal to each of the first direction and the second direction; a second side area configured to connect to the second bent area and configured to extend in the third direction along the perimeter of the image sensor; a third bent area configured to connect to the second side area and configured to bend in a fourth direction that is opposite to the second direction; a third side area configured to connect to the third bent area and configured to extend in the fourth direction along the perimeter of the image sensor; a fourth bent area configured to connect to the third side area and configured to bend in a fifth direction that is opposite to the third direction; a fourth side area configured to connect to the fourth bent area and configured to extend in the fifth direction along the perimeter of the image sensor; a fifth bent area configured to connect to the fourth side area and configured to bend in the second direction; a fifth side area configured to connect to the fifth bent area and configured to extend in the second direction; a second folded area configured to connect to the fifth side area and configured to fold in a sixth direction that is opposite to the first direction; and a sixth bent area configured to connect to the second folded area, the sixth bent area being configured to bend toward the connector, and configured to connect to the connector.

According to an aspect of the disclosure, the is provided a camera module including: a lens comprising an optical axis; a lens housing configured to accommodate the lens; an image sensor configured to receive light passing through the lens; a connector configured to receive an electrical signal from the image sensor; and a flexible printed circuit board (FPCB) configured to connect the image sensor and the connector, wherein the FPCB includes: a first folded area configured to connect to the image sensor and configured to fold in a first direction with respect to the image sensor; a first bent area configured to connect to the first folded area and configured to bend in a second direction that is substantially orthogonal to the first direction; a second folded area configured to connect to the first bent area and configured to fold in a third direction that is substantially orthogonal to each of the first direction and the second direction; a side area configured to connect to the second folded area and configured to extend in the third direction along a perimeter of the image sensor; a second bent area configured to connect to the side area and configured to bend in a fourth direction that is opposite to the first direction; a third folded area configured to connect to the second bent area and configured to fold in a fifth direction that is opposite to the second direction; and a third bent area configured to connect to the third folded area, the third bent area configured to bend toward the connector, and configured to connect to the connector.

BRIEF DESCRIPTION OF THE DRAWINGS

The above and other aspects, features, and advantages of one or more embodiments of the disclosure will be more apparent from the following detailed description, taken in conjunction with the accompanying drawings, in which.

DETAILED DESCRIPTION

Figure 1:
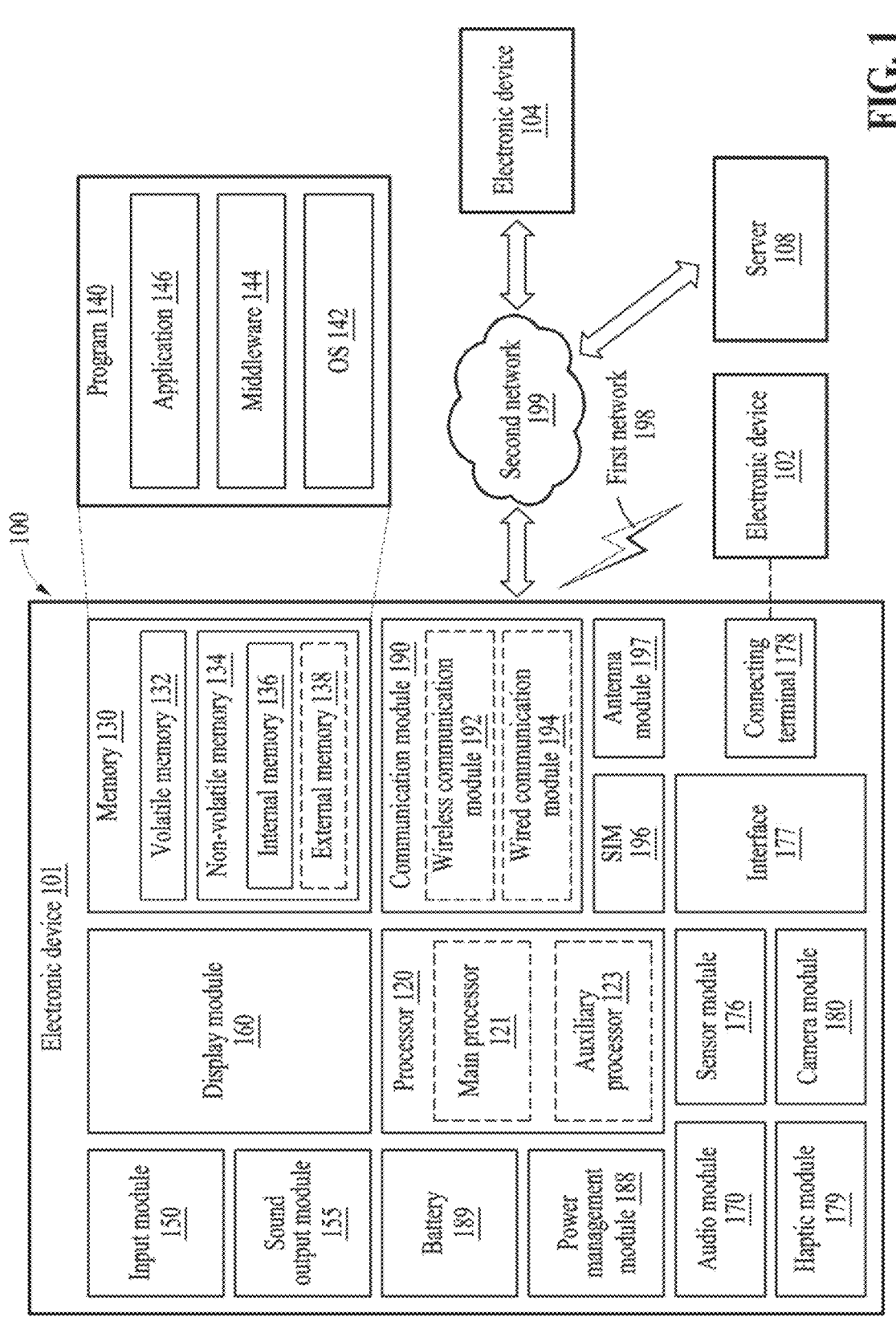
FIG. 1 is a block diagram of an electronic device in a network environment, according to an embodiment.

FIG. 1 is a block diagram of an electronic device in a network environment according to an embodiment.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the above components may be omitted from the electronic device 101, or one or more other components may be added in the electronic device 101. In some embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an embodiment, as at least a portion of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented as separate from, or as part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state, or together with the main processor 121 while the main processor 121 is an active state (e.g., executing an application). According to an embodiment, the auxiliary processor 123 (e.g., an ISP or a CP) may be implemented as a portion of another component (e.g., the camera module 180 or the communication module 190) that is functionally related to the auxiliary processor 123. According to an embodiment, the auxiliary processor 123 (e.g., an NPU) may include a hardware structure specified for artificial intelligence (AI) model processing. An artificial intelligence model may be generated through machine learning. Such learning may be performed, e.g., by the electronic device 101 where the artificial intelligence is performed, or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network, or a combination of two or more thereof, but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing a record. The receiver may be used to receive an incoming call. According to an embodiment, the receiver may be implemented separately from the speaker or as a portion of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to sense a touch, or a pressure sensor adapted to measure an intensity of a force incurred by the touch.

The audio module 170 may convert a sound into an electrical signal or vice versa. According to an embodiment, the audio module 170 may obtain the sound via the input module 150 or output the sound via the sound output module 155 or an external electronic device (e.g., an electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., by wire) or wirelessly. According to an embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or an electrical stimulus which may be recognized by a user via his or her tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, ISPs, or flashes.

The power management module 188 may manage power supplied to the electronic device 101. According to an embodiment, the power management module 188 may be implemented as, for example, at least a portion of a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that operate independently of the processor 120 (e.g., an application processor) and support direct (e.g., wired) communication or wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth-generation (5G) network, a next-generation communication network, the Internet, or a computer network (e.g., LAN or wide area network (WAN)). These various types of communication modules may be implemented as a single component (e.g., a single chip), or may be implemented as multiple components (e.g., multiple chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a fourth-generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., an external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may be transmitted or received between the communication module 190 and the external electronic device via the selected at least one antenna. According to an embodiment, another component (e.g., a radio frequency integrated circuit (RFIC)) other than the radiating element may be additionally formed as a portion of the antenna module 197.

According to an embodiment, the antenna module 197 may form a mmWave antenna module. According to an embodiment, the mmWave antenna module may include a PCB, an RFIC disposed on a first surface (e.g., a bottom surface) of the PCB or adjacent to the first surface and capable of supporting a designated a high-frequency band (e.g., the mm Wave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 and 104 may be a device of a same type as, or a different type from, the electronic device 101. According to an embodiment, all or some of operations to be executed by the electronic device 101 may be executed at one or more of external electronic devices (e.g., the external electronic devices 102 and 104, or the server 108). For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to one or more embodiments disclosed herein may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic device is not limited to those described above.

It should be appreciated that embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related components. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms such as "$1^{st}$," and "$2^{nd}$," or "first" and "second" may be used to simply distinguish a corresponding component from another, and do not limit the components in other aspect (e.g., importance or order). It is to be understood that if a component (e.g., a first component) is referred to, with or without the term "operatively" or "communicatively," as "coupled with," "coupled to," "connected with," or "connected to" another component (e.g., a second component), the component may be coupled with the other component directly (e.g., wiredly), wirelessly, or via a third component.

As used in connection with embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to embodiments disclosed herein may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to embodiments, each component (e.g., a module or a program) of the above-described components may include a single entity or multiple entities, and some of the multiple entities may be separately disposed in different components. According to embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to embodiments, operations performed by the module, the program, or another component may be carried out sequentially, in parallel, repeatedly, or heuristically, or one or more of the operations may be executed in a different order or omitted, or one or more other operations may be added.

Figure 2:
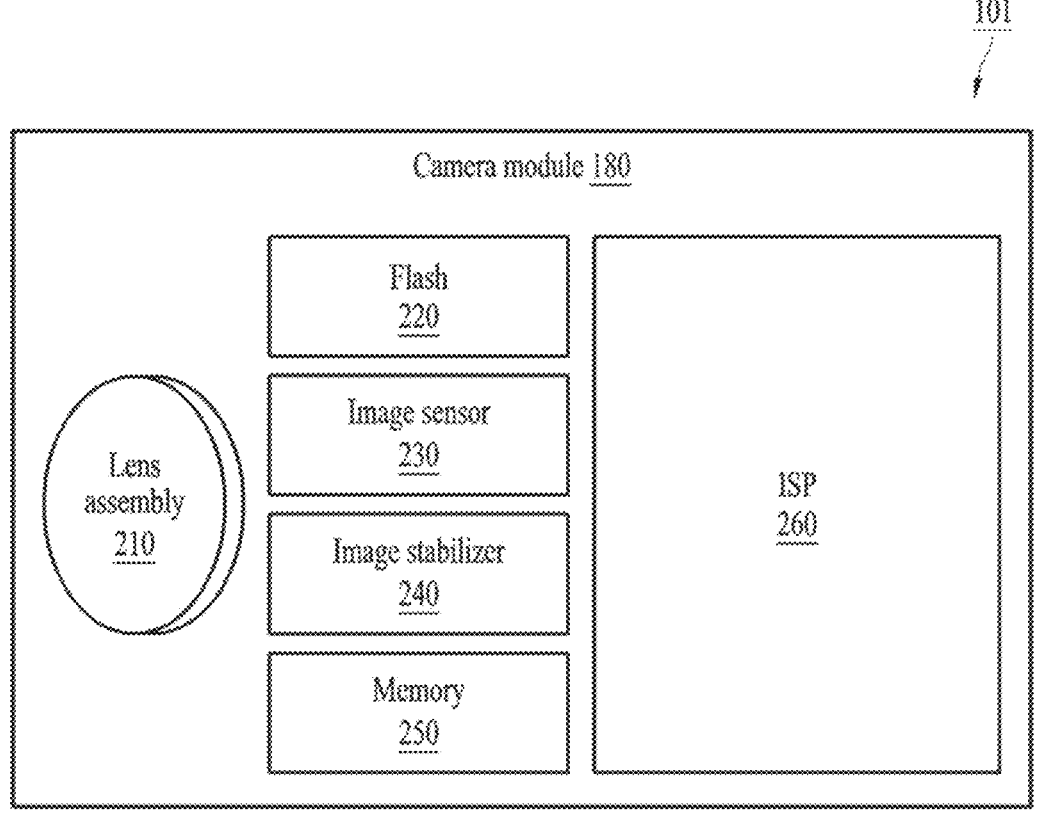
FIG. 2 is a block diagram illustrating a camera module, according to an embodiment.

FIG. 2 is a block diagram illustrating a camera module according to an embodiment.

Referring to FIG. 2, the camera module 180 may include a lens assembly 210, a flash 220, an image sensor 230, an image stabilizer 240, a memory 250 (e.g., a buffer memory), or an ISP 260. The lens assembly 210 may collect light emitted from an object which is a target of which an image is to be captured. The lens assembly 210 may include one or more lenses. According to an embodiment, the camera module 180 may include a plurality of lens assemblies 210. In this case, the camera module 180 may constitute, for example, a dual camera, a 360-degree camera, or a spherical camera. A portion of the lens assemblies 210 may have the same lens properties (e.g., an angle of view, a focal length, an auto focus, an f number, or an optical zoom), or at least one lens assembly may have one or more lens properties that are different from those of another lens assembly. The lens assembly 210 may include, for example, a wide-angle lens or a telephoto lens.

The flash 220 may emit light to be used to enhance light emitted or reflected from the object. According to an embodiment, the flash 220 may include one or more light-emitting diodes (LEDs) (e.g., a red-green-blue (RGB) LED, a white LED, an infrared (IR) LED, or an ultraviolet (UV) LED), or a xenon lamp. The image sensor 230 may obtain an image corresponding to the object by converting light emitted or reflected from the object and transmitted through the lens assembly 210 into an electrical signal. According to an embodiment, the image sensor 230 may include, for example, one image sensor selected from among image sensors having different properties, such as, for example, an RGB sensor, a black and white (BW) sensor, an IR sensor, or a UV sensor, a plurality of image sensors having the same property, or a plurality of image sensors having different properties. Each image sensor included in the image sensor 230 may be implemented using, for example, a charged coupled device (CCD) sensor or a complementary metal-oxide-semiconductor (CMOS) sensor.

The image stabilizer 240 may move at least one lens included in the lens assembly 210 or the image sensor 230 in a specific direction, or control an operation characteristic (e.g., adjust the read-out timing) of the image sensor 230, in response to a movement of the camera module 180 or the electronic device 101 including the camera module 180. This may compensate for at least a portion of a negative effect of the movement on an image to be captured. According to an embodiment, the image stabilizer 240 may sense such a movement of the camera module 180 or the electronic device 101 using a gyro sensor or an acceleration sensor disposed inside or outside the camera module 180. According to an embodiment, the image stabilizer 240 may be implemented as, for example, an optical image stabilizer. The memory 250 may at least temporarily store at least a portion of the image obtained through the image sensor 230 for a subsequent image processing task. For example, when image acquisition is delayed by a shutter or a plurality of images is obtained at a high speed, an obtained original image (e.g., a Bayer-patterned image or a high-resolution image) may be stored in the memory 250, and a copy image (e.g., a low-resolution image) corresponding the original image may be previewed through the display module 160. Subsequently, when a specified condition (e.g., a user input or a system command) is satisfied, at least a portion of the original image stored in the memory 250 may be obtained and processed by, for example, the ISP 260. According to an embodiment, the memory 250 may be configured as at least part of the memory 130 or as a separate memory operated independently of the memory 130.

The ISP 260 may perform one or more image processing operations on the image obtained through the image sensor 230 or the image stored in the memory 250. The image processing operations may include, for example, depth map generation, three-dimensional (3D) modeling, panorama generation, feature point extraction, image synthesis, or image compensation (e.g., noise reduction, resolution adjustment, brightness adjustment, blurring, sharpening, or softening. Additionally or alternatively, the ISP 260 may control at least one of the components (e.g., the image sensor 230) included in the camera module 180 (e.g., control an exposure time, control a read-out timing, or the like). The image processed by the ISP 260 may be stored again in the memory 250 for further processing or may be provided to an external component (e.g., the memory 130, the display module 160, the electronic device 102, the electronic device 104, or the server 108) of the camera module 180. According to an embodiment, the ISP 260 may be configured as at least part of the processor 120 or as a separate processor operated independently of the processor 120. When the ISP 260 is configured as a processor separate from the processor 120, at least one image processed by the ISP 260 may be displayed as it is or be displayed through the display module 160 after additional image processing is performed by the processor 120.

According to an embodiment, the electronic device 101 may include a plurality of camera modules 180 having different properties or functions. In this case, for example, at least one of the plurality of camera modules 180 may be a wide-angle camera, and at least another one of the plurality of camera modules 180 may be a telephoto camera. Similarly, at least one of the plurality of camera modules 180 may be a front camera, and at least another one of the plurality of camera modules 180 may be a rear camera.

Figure 3:
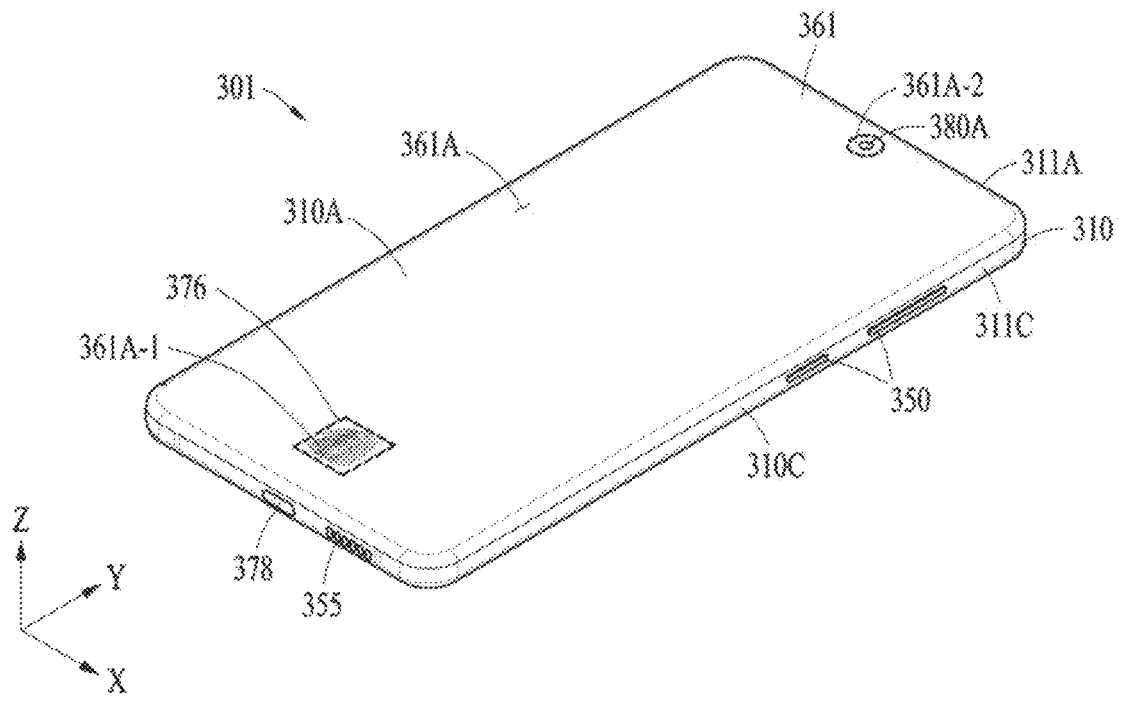
FIG. 3 is a perspective view of an electronic device in one direction, according to an embodiment.
Figure 4:
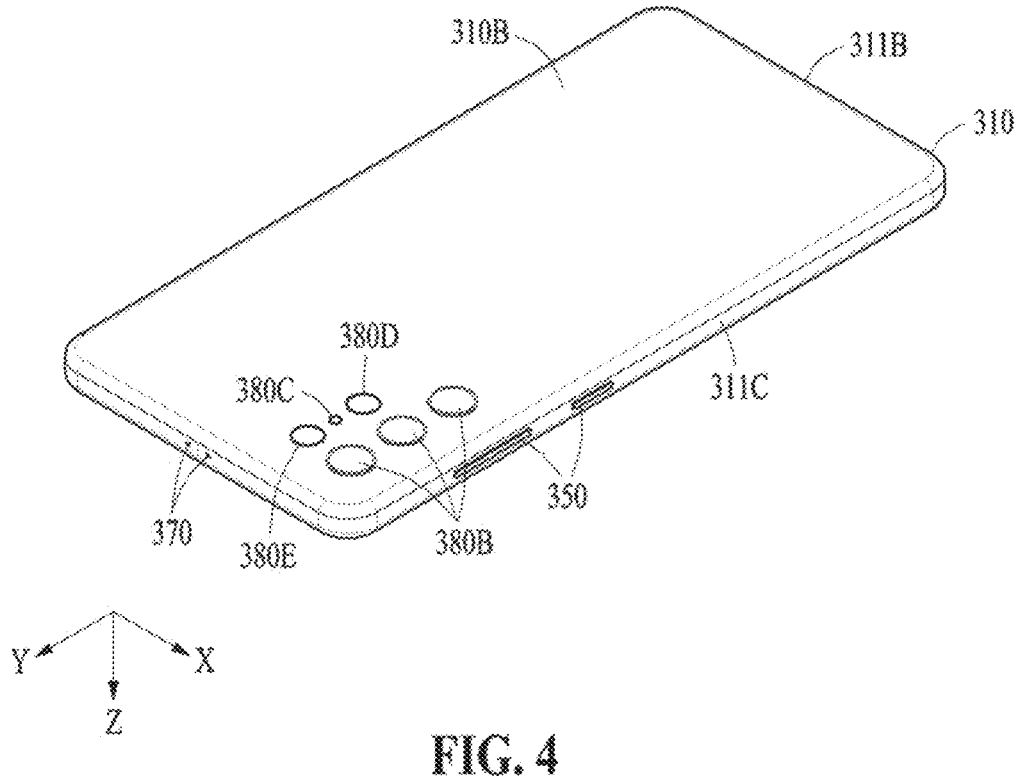
FIG. 4 is a perspective view of an electronic device in another direction, according to an embodiment.

FIG. 3 is a perspective view of an electronic device in one direction according to an embodiment. FIG. 4 is a perspective view of an electronic device in another direction according to an embodiment.

Referring to FIGS. 3 and 4, an electronic device 301 (e.g., the electronic device 101 of FIG. 1) may include a housing 310 including a first surface 310A (e.g., a front surface), a second surface 310B (e.g., a rear surface), and a third surface 310C (e.g., a side surface) enclosing a space between the first surface 310A and the second surface 310B. The first surface 310A may be formed by a first plate 311A of which at least a portion is substantially transparent. For example, the first plate 311A may include a polymer plate or a glass plate including at least one coating layer. The second surface 310B may be formed by a second plate 311B that is substantially opaque. For example, the second plate 311B may be formed of coated or tinted glass, ceramic, polymer, metal (e.g., aluminum, stainless steel (STS), or magnesium), or a combination thereof. The third surface 310C may be formed by a frame 311C that is coupled to the first plate 311A and the second plate 311B and includes a metal and/or a polymer. The second plate 311B and the frame 311C may be formed monolithically. The second plate 311B and the frame 311C may be formed of substantially the same material (e.g., aluminum).

The electronic device 301 may include an input module 350 (e.g., the input module 150 of FIG. 1). The input module 350 may be positioned on the third surface 310C. The input module 350 may include at least one key input device. For example, the key input device may include one or more mechanical actuators (e.g., buttons), one or more capacitors, and/or one or more inductors.

The electronic device 301 may include a sound output module 355 (e.g., the sound output module 155 of FIG. 1). The sound output module 355 may be positioned on the third surface 310C. The sound output module 355 may include one or more holes.

The electronic device 301 may include a display module 361 (e.g., the display module 160 of FIG. 1). The display module 361 may be positioned on the first surface 310A. The display module 361 may be visible through at least a portion of the first plate 311A. The display module 361 may have a shape that is substantially the same as the shape of an outer edge of the first plate 311A. The periphery of the display module 361 may substantially coincide with the outer edge of the first plate 311A. The display module 361 may include a touch sensing circuit, a pressure sensor for measuring an intensity (pressure) of a touch, and/or a digitizer for detecting a magnetic-type stylus pen. The display module 361 may include a screen display area 361A that is visually exposed to display content using pixels. The screen display area 361A may include a sensing area 361A-1. The sensing area 361A-1 may overlap at least one area of the screen display area 361A. The sensing area 361A-1 may allow transmission of an input signal related to a sensor module 376 (e.g., the sensor module 176 of FIG. 1). The sensing area 361A-1 may display content, like the screen display area 361A that does not overlap the sensing area 361A-1. For example, the sensing area 361A-1 may display the content while the sensor module 376 is not operating. At least a portion of a camera area 361A-2 may overlap the screen display area 361A. The screen display area 361A may include the camera area 361A-2. The camera area 361A-2 may allow transmission of an optical signal related to a first camera module 380A (e.g., the camera module 180 of FIG. 1 and/or the camera module 180 of FIG. 2). At least a portion of the camera area 361A-2, that overlaps the screen display area 361A, may display content, similarly to the screen display area 361A that does not overlap the camera area 361A-2. For example, the camera area 361A-2 may display the content while the first camera module 380A is not operating.

The electronic device 301 may include an audio module 370 (e.g., the audio module 170 of FIG. 1). The audio module 370 may be positioned on the third surface 310C. The audio module 370 may obtain a sound through at least one hole.

The electronic device 301 may include the sensor module 376. The sensor module 376 may be positioned on the first surface 310A. The sensor module 376 may form the sensing area 361A-1 in at least a portion of the screen display area 361A. The sensor module 376 may receive an input signal transmitted through the sensing area 361A-1 and generate an electrical signal based on the received input signal. For example, the input signal may have a designated physical quantity (e.g., heat, light, temperature, sound, pressure, or ultrasound). The input signal may include a signal related to biometric information (e.g., a fingerprint) of a user.

The electronic device 301 may include a connecting terminal 378 (e.g., the connecting terminal 178 of FIG. 1). The connecting terminal 378 may be positioned on the third surface 310C. For example, when the electronic device 301 is viewed in one direction (e.g., the +Y direction), the connecting terminal 378 may be positioned substantially in a central portion of the third surface 310C, and the sound output module 355 may be positioned on one side (e.g., the right side) with respect to the connecting terminal 378.

The electronic device 301 may include the first camera module 380A (e.g., the camera module 180 of FIG. 1 and/or the camera module 180 of FIG. 2). The first camera module 380A may be positioned on the first surface 310A. At least a portion of the first camera module 380A may be positioned under the display module 361. The first camera module 380A may receive an optical signal transmitted through the camera area 361A-2.

The electronic device 301 may include a plurality of second camera modules 380B (e.g., the camera module 180 of FIG. 1 and/or the camera module 180 of FIG. 2). The plurality of second camera modules 380B may be positioned on the second surface 310B. The plurality of second camera modules 380B may be arranged in a first row in one direction (e.g., the Y direction) of the second plate 311B. The plurality of second camera modules 380B may have different fields of view. For example, the plurality of second camera modules 380B may include an ultra wide-angle camera, a wide-angle camera, and/or a tele camera.

The electronic device 301 may include a light module 380C (e.g., the flash 220 of FIG. 2). The light module 380C may be arranged in a second row substantially parallel to the first row of the plurality of second camera modules 380B on the second surface 310B. The light module 380C may include one or more light-emitting diodes or xenon lamps. The light module 380C may include a sensor configured to detect external light. For example, the sensor may include a flicker sensor.

The electronic device 301 may include a third camera module 380D. The pixel, magnification, and/or field of view of the third camera module 380D may differ from the pixel, magnification, and/or field of view of at least one second camera module 380B. The third camera module 380D may be arranged in the second row substantially parallel to the first row of the plurality of second camera modules 380B on the second surface 310B.

The electronic device 301 may include a fourth camera module 380E. The fourth camera module 380E, which may also be referred to as a "depth camera" or a "time-of-flight (ToF) camera", may be configured to measure the distance between the fourth camera module 380E and an object. For example, the fourth camera module 380E may be configured to measure the distance using at least one or a combination of an ultrasonic wave, an infrared ray, or a laser. The fourth camera module 380E may be arranged in the second row substantially parallel to the first row of the plurality of second camera modules 380B on the second surface 310B.

Meanwhile, one or more embodiments set forth herein may also apply to electronic devices of various shapes/forms (e.g., a foldable electronic device, a slidable electronic device, a rollable electronic device, a digital camera, a digital video camera, a tablet PC, a laptop computer, and other electronic devices), in addition to the electronic device shown in FIGS. 3 and 4.

As used herein, the terms "substantially", "approximately", "generally", and "about" in reference to a given parameter, property, or condition may include a degree that one of ordinary skill in the art would understand that the given parameter, property, or condition is met with a small degree of variance, such as within acceptable manufacturing tolerances. For example, a parameter that is substantially met may be at least 90% met, at least 95% met, or at least 99% met.

Figure 5:
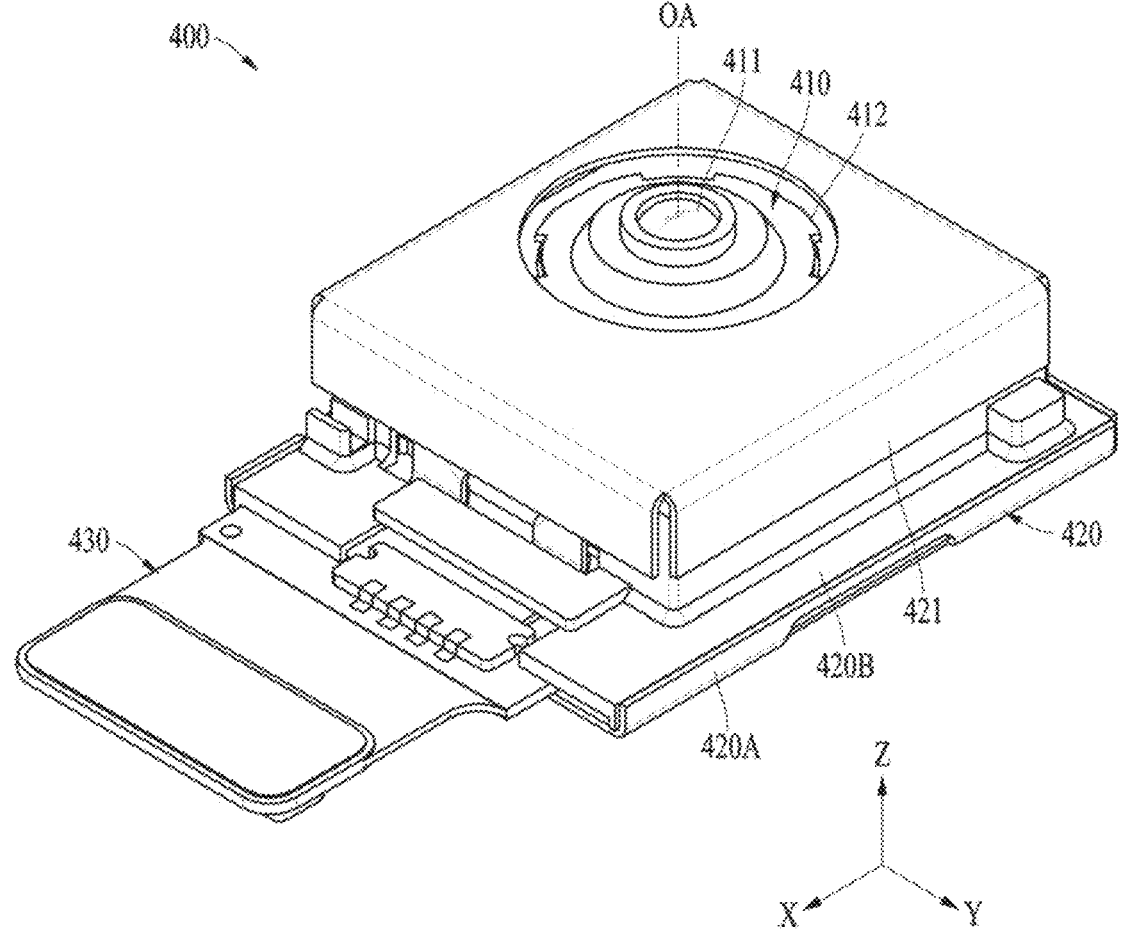
FIG. 5 is a perspective view of a camera module, according to an embodiment.
Figure 6:
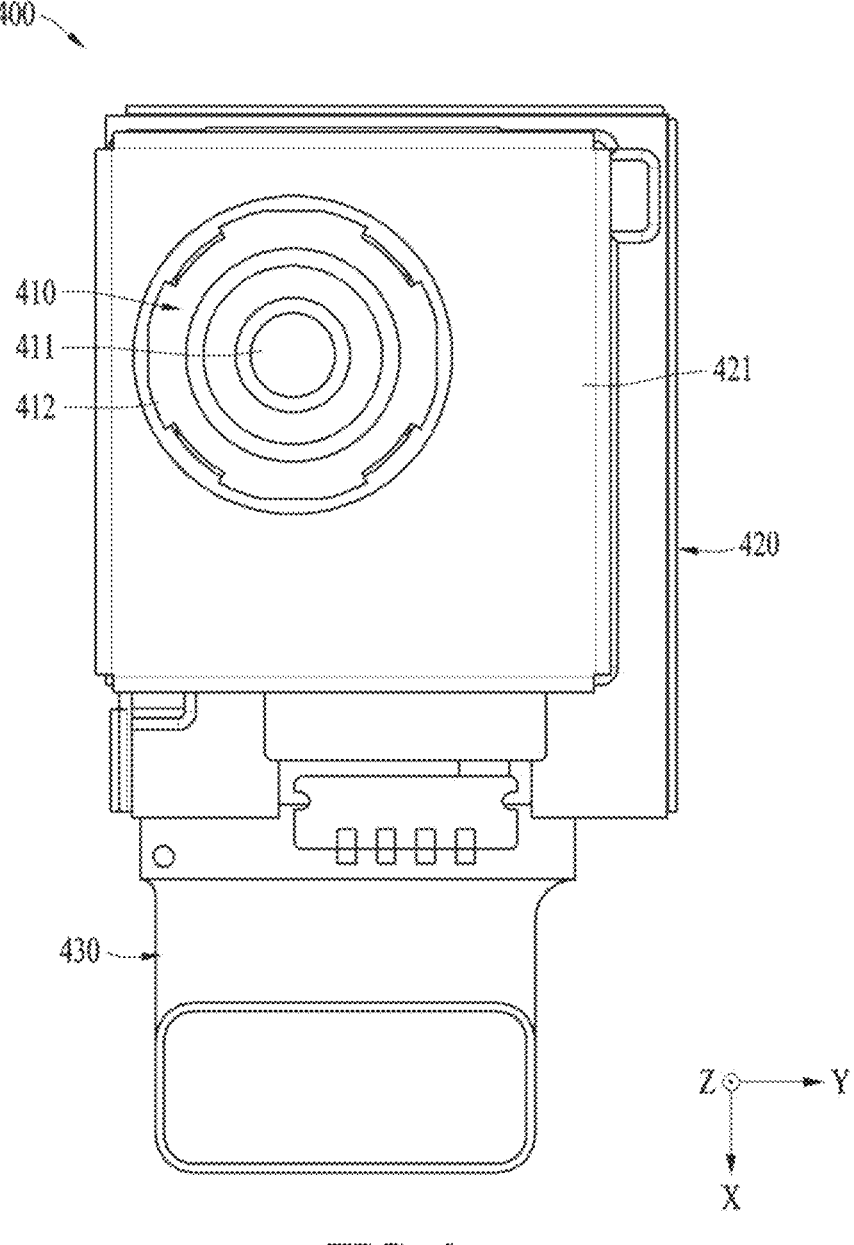
FIG. 6 is a plan view of a camera module, according to an embodiment.
Figure 7:
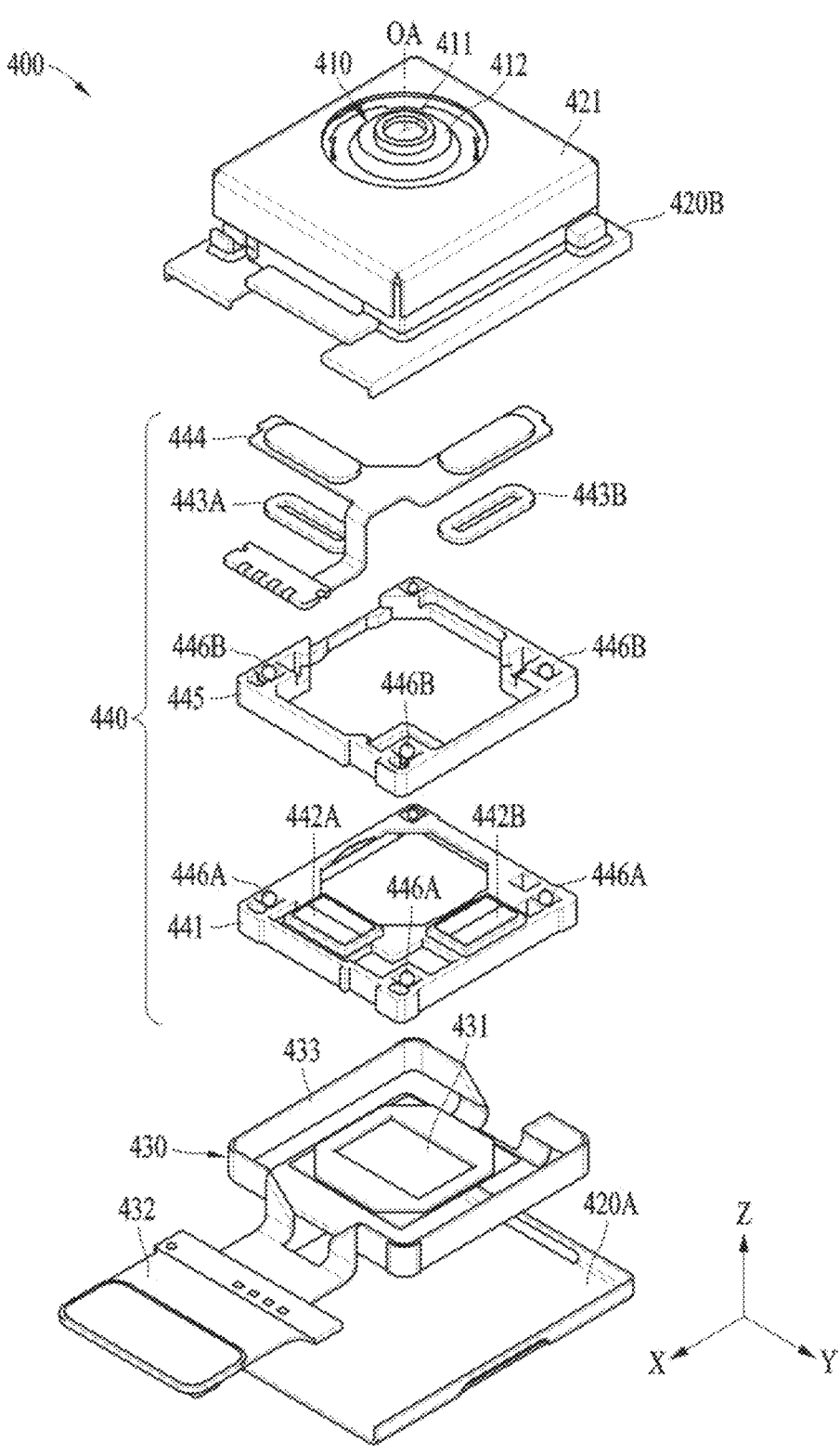
FIG. 7 is an exploded perspective view of a camera module, according to an embodiment.

FIG. 5 is a perspective view of a camera module according to an embodiment. FIG. 6 is a plan view of the camera module according to an embodiment. FIG. 7 is an exploded perspective view of the camera module according to an embodiment.

Referring to FIGS. 5 to 7, a camera module 400 (e.g., the camera module 180 of FIG. 1, and/or the camera module 180 of FIG. 2, and/or the first camera module 380A, the second camera module 380B, and/or the third camera module 380D of FIGS. 3 and 4) may include a lens assembly 410 (e.g., the lens assembly 210 of FIG. 2). The lens assembly 410 may include at least one lens 411 having an optical axis OA. The optical axis OA may be defined as an imaginary line connecting the center of curvature of one surface (e.g., the +Z-directional surface) of the lens 411 and the center of curvature of the other surface (e.g., the −Z-directional surface) of the lens 411. The lens assembly 410 may include a lens housing 412, which may also be referred to as a "lens barrel". The lens housing 412 may be configured to accommodate at least one lens 411.

The camera module 400 may include a camera housing 420 configured to at least partially accommodate one or more camera-related components (e.g., the lens assembly 410). The camera housing 420 may include a base plate 420A and an enclosure 420B combined with the base plate 420A to form an accommodation space. The camera module 400 may include a camera cover 421, which may also be referred to as a "shield can". The camera cover 421 may form a space for accommodating one or more camera-related components together with the camera housing 420. The camera housing 420 may have a reduced dimension in the X-direction and a reduced dimension in the Y-direction. For example, when viewing the plan view of FIG. 6, the margin area excluding the area occupied by the camera cover 421 from the area of the camera housing 420 may be reduced by about 7% to about 20%.

The camera module 400 may include a connecting assembly 430. The connecting assembly 430 may include an image sensor 431 (e.g., the image sensor 230 of FIG. 2) configured to convert light passing through at least one lens 411 into an electrical signal. The connecting assembly 430 may include a connector 432 configured to transmit the electrical signal converted by the image sensor 431 to another component (e.g., the processor 120 of FIG. 1 and/or the image signal processor 260 of FIG. 2). The connecting assembly 430 may include an FPCB 433 configured to physically and electrically connect the image sensor 431 and the connector 432. The FPCB 433 may extend at least partially along the perimeter of the image sensor 431. The FPCB 433 may surround the lens housing 412.

The camera module 400 may include an actuator 440 (e.g., the image stabilizer 240 of FIG. 2). The actuator 440 may change the configuration of the FPCB 433 and displace the image sensor 431 by applying a force to at least a portion of the FPCB 433 (e.g., the +/−X-directional portion and/or the +/−Y-directional portion).

The actuator 440 may include a carrier 441 configured to carry the lens housing 412. For example, the carrier 441 may carry the lens housing 412 in the +/−X direction and/or the +/−Y direction. The carrier 441 may be surrounded by the FPCB 433.

In an embodiment, the carrier 441 may carry the lens housing 412 in a direction (e.g., the +/−Z direction) according to the optical axis OA. In an embodiment, the camera module 400 may include an additional actuator configured to drive the lens housing 412 in the direction (e.g., the +/−Z direction) according to the optical axis OA. The additional actuator may include an additional carrier distinct from the carrier 441.

The actuator 440 may include a plurality of magnets 442A and 442B, which may also be referred to as "electromagnetic elements". For example, the first magnet 442A may be positioned in the carrier 441 in one direction (e.g., the +/−X direction), and the second magnet 442B may be positioned in the carrier 441 in another direction (e.g., the +/−Y direction).

The actuator 440 may include a plurality of coils 443A and 443B), which may also be referred to as "electromagnetic elements". For example, the first coil 443A may be configured to be electronically coupled to the first magnet 442A, and the second coil 443B may be configured to be electronically coupled to the second magnet 442B.

The actuator 440 may include a yoke 444 configured so that the plurality of coils 443A and 443B) may be positioned. The yoke 444 may provide an electrical path to the plurality of coils 443A and 443B. A portion of the yoke 444 may be connected to the connector 432. The yoke 444 may be positioned in the enclosure 420B.

The actuator 440 may include a middle guide 445 configured to guide the carrier 441 in various directions (e.g., the +/−X direction and/or the +/−Y direction). The carrier 441 may be guided in one direction (e.g., the +/−Y direction) by a first ball 446A accommodated at least partially between a groove formed in one or more areas (e.g., corner areas) of one surface (e.g., the −Z-directional surface) of the middle guide 445 and a groove formed in one or more areas (e.g., corner areas) of one surface (e.g., the +Z-directional surface) of the carrier 441. The middle guide 445 may be guided in another direction (e.g., the +/−X direction) by a second ball 446B accommodated at least partially between a groove formed in one or more areas (e.g., corner areas) of the other surface (e.g., the +Z-directional surface) of the middle guide 445 and a groove formed in one surface (e.g., the −Z-directional surface) of the enclosure 420B.

In an embodiment, the actuator 440 may include a suspension wire, an elastic body (e.g., a spring), a shape-memory alloy actuator, or any other suitable type of actuator.

Figure 8:
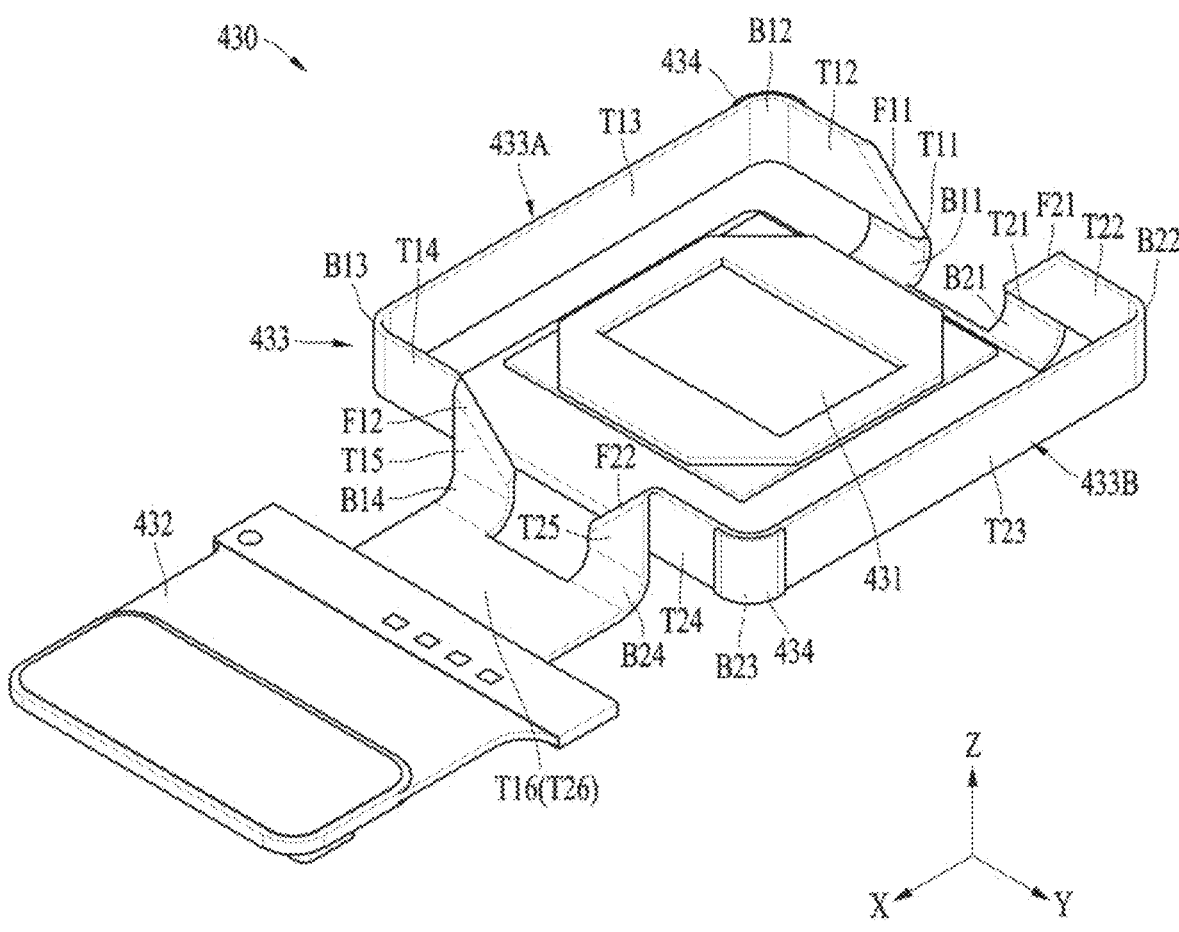
FIG. 8 is a front perspective view of a connecting assembly, according to an embodiment.
Figure 9:
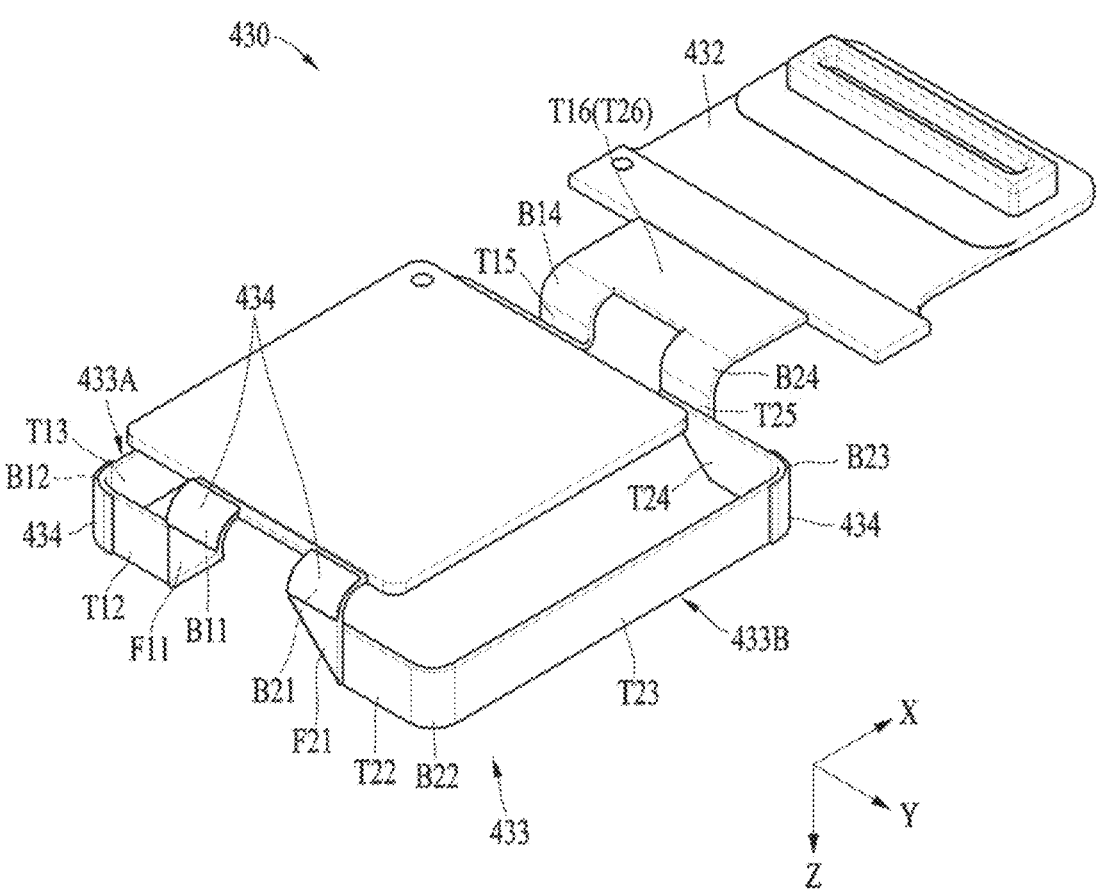
FIG. 9 is a rear perspective view of a connecting assembly, according to an embodiment.

FIG. 8 is a front perspective view of a connecting assembly according to an embodiment. FIG. 9 is a rear perspective view of the connecting assembly according to an embodiment.

Referring to FIGS. 8 and 9, the connecting assembly 430 may include the image sensor 431, the connector 432, and the FPCB 433. The FPCB 433 may at least partially include a plurality of prongs. For example, the FPCB 433 may include a first prong 433A starting from a portion (e.g., a portion close to the −Y-directional edge) of one edge (e.g., the −X-directional edge) of the image sensor 431, and a second prong 433B starting from another portion (e.g., a portion close to the +Y-directional edge) of the one edge (e.g., the −X-directional edge) of the image sensor 431. The first prong 433A and the second prong 433B may be integrated into a single prong before being connected to the connector 432. In an embodiment, the first prong 433A and the second prong 433B may be integrated into a single prong and connected to the image sensor 431. Herein, the first prong 433A and the second prong 433B may be referred to as the "first FPCB" and the "second FPCB", respectively.

The first prong 433A may include a bent area B11 bent at a first angle (e.g., about 90 degrees) in a first optical axis direction (e.g., the +Z direction) with respect to the image sensor 431 positioned on one plane (e.g., the XY plane). The bent area B11 may be directly connected to the image sensor 431. In an embodiment, the first prong 433A may include an additional area between the image sensor 431 and the bent area B11. The additional area may be referred to as the "base area". The additional area and the image sensor 431 may be on substantially the same plane.

The first prong 433A may include a side area T11 extending substantially in the first optical axis direction (e.g., the +Z direction). The side area T11 may be connected to the bent area B11.

The first prong 433A may include a folded area F11 folded in one direction (e.g., the −Y direction) substantially orthogonal to the first optical axis direction (e.g., the +Z direction). The folded area F11 may be an area that is bent at a second angle (e.g., about 45 degrees) less than the first angle inward with respect to the side area T11 and folded at a third angle (e.g., about 180 degrees) greater than the first angle in one direction (e.g., the −Y direction). In an embodiment, the folded area F11 may be an area that is bent at the second angle outward with respect to the side area T11 and folded at the third angle in one direction (e.g., the −Y direction). The folded area F11 may be directly connected to the side area T11. In an embodiment, the folded area F11 may be directly connected to the bent area B11 without the side area T11.

The first prong 433A may include a side area T12 extending in one direction (e.g., the −Y direction). The side area T12 may extend along a portion of the perimeter (e.g., the −X-directional edge) of the image sensor 431. The side area T12 may be connected to the folded area F11.

The first prong 433A may include a bent area B12 bent in a direction (e.g., the +X direction) substantially orthogonal to each of the first optical axis direction (e.g., the +Z direction) and the extending direction of the side area T12 (e.g., the −Y direction). The bent area B12 may be an area that is bent at a first angle (e.g., about 90 degrees) with respect to the side area T12. At least a portion of the bent area B12 may be substantially aligned with one corner area of the image sensor 431 (e.g., the corner area between the −X-directional edge and the −Y-directional edge) in the first optical axis direction (e.g., the +Z direction). The bent area B12 may be connected to the side area T12.

The first prong 433A may include a side area T13 extending in a direction (e.g., the +X direction) substantially orthogonal to each of the first optical axis direction (e.g., the +Z direction) and the extending direction of the side area T12 (e.g., the −Y direction). The side area T13 may extend along a portion of the perimeter (e.g., the −Y-directional edge) of the image sensor 431. The side area T13 may be connected to the bent area B12.

The first prong 433A may include a bent area B13 bent in a direction (e.g., the +Y direction) substantially orthogonal to each of the first optical axis direction (e.g., the +Z direction) and the extending direction of the side area T13 (e.g., the +X direction). The bent area B13 may be an area that is bent at the first angle (e.g., about 90 degrees) with respect to the side area T13. At least a portion of the bent area B13 may be substantially aligned with one corner area of the image sensor 431 (e.g., the corner area between the −Y-directional edge and the +X-directional edge) in the first optical axis direction (e.g., the +Z direction). The bent area B13 may be connected to the side area T13.

The first prong 433A may include a side area T14 extending in a direction (e.g., the +Y direction) substantially orthogonal to each of the first optical axis direction (e.g., the +Z direction) and the extending direction of the side area T13 (e.g., the +X direction) and opposite to the extending direction of the side area T12 (e.g., the −Y direction). The side area T14 may extend along a portion of the perimeter (e.g., the +X-directional edge) of the image sensor 431. The side area T14 may be connected to the bent area B13. The side area T14 may be positioned opposite the side area T12.

The first prong 433A may include a folded area F12 folded in a second optical axis direction (e.g., the −Z direction) opposite to the first optical axis direction (e.g., the +Z direction). The folded area F12 may be an area that is bent at the second angle (e.g., about 45 degrees) less than the first angle outward with respect to the side area T14 and folded at the third angle (e.g., about 180 degrees) greater than the first angle in the second optical axis direction (e.g., the −Z direction). In an embodiment, the folded area F12 may be an area that is bent at the second angle inward with respect to the side area T14 and folded at the third angle in the second optical axis direction (e.g., the −Z direction).

The first prong 433A may include a side area T15 extending substantially in the second optical axis direction (e.g., the −Z direction). The side area T15 may be connected to the folded area F12.

The first prong 433A may include a bent area B14 bent at a first angle (e.g., about 90 degrees) with respect to the second optical axis direction (e.g., the −Z direction) in an outward direction (e.g., the +X direction) of the image sensor 431. The bent area B14 may be an area that is bent toward the connector 432.

The first prong 433A may include a base area T16 connecting the bent area B14 and the connector 432. The base area T16 and the connector 432 may be substantially on the same plane. The base area T16 may be connected to a partial area (e.g., a bent area B24) of the second prong 433B. In an embodiment, the bent area B14 may be directly connected to the connector 432 without the base area T16.

The second prong 433B may include a bent area B21 bent at the first angle (e.g., about 90 degrees) in the first optical axis direction (e.g., the +Z direction) with respect to the image sensor 431 positioned on one plane (e.g., the XY plane). The bent area B21 may be directly connected to the image sensor 431. The bent area B21 may be separated from the bent area B11 along an edge (e.g., the −X-directional edge) of the image sensor 431. In an embodiment, the second prong 433B may include an additional area between the image sensor 431 and the bent area B21. The additional area may be referred to as the "base area". The additional area may connect the bent area B11 and the bent area B21. The additional area and the image sensor 431 may be on substantially the same plane.

The second prong 433B may include a side area T21 extending substantially in the first optical axis direction (e.g., the +Z direction). The side area T21 may be connected to the bent area B21.

The second prong 433B may include a folded area F21 folded in one direction (e.g., the +Y direction) substantially orthogonal to the first optical axis direction (e.g., the +Z direction). The folded area F21 may be an area that is bent at the second angle (e.g., about 45 degrees) less than the first angle inward with respect to the side area T21 and folded at the third angle (e.g., about 180 degrees) greater than the first angle in one direction (e.g., the +Y direction). In an embodiment, the folded area F21 may be an area that is bent at the second angle outward with respect to the side area T21 and folded at the third angle in one direction (e.g., the +Y direction). The folded area F21 may be directly connected to the side area T21. In an embodiment, the folded area F21 may be directly connected to the bent area B21 without the side area T21.

The second prong 433B may include a side area T22 extending in one direction (e.g., the +Y direction). The side area T22 may extend along a portion of the perimeter (e.g., the −X-directional edge) of the image sensor 431. The side area T22 may be connected to the folded area F21.

The second prong 433B may include a bent area B22 bent in a direction (e.g., the +X direction) substantially orthogonal to each of the first optical axis direction (e.g., the +Z direction) and the extending direction of the side area T22 (e.g., the +Y direction). The bent area B22 may be an area that is bent at the first angle (e.g., about 90 degrees) with respect to the side area T22. At least a portion of the bent area B22 may be substantially aligned with one corner area of the image sensor 431 (e.g., the corner area between the −X-directional edge and the +Y-directional edge) in the first optical axis direction (e.g., the +Z direction). The bent area B22 may be connected to the side area T22.

The second prong 433B may include a side area T23 extending in a direction (e.g., the +X direction) substantially orthogonal to each of the first optical axis direction (e.g., the +Z direction) and the extending direction of the side area T22 (e.g., the +Y direction). The side area T23 may extend along a portion of the perimeter (e.g., the +Y-directional edge) of the image sensor 431. The side area T23 may be connected to the bent area B22. The side area T23 may be substantially parallel to the side area T13.

The second prong 433B may include a bent area B23 bent in a direction (e.g., the −Y direction) substantially orthogonal to each of the first optical axis direction (e.g., the +Z direction) and the extending direction of the side area T23 (e.g., the +X direction). The bent area B23 may be an area that is bent at the first angle (e.g., about 90 degrees) with respect to the side area T23. At least a portion of the bent area B23 may be substantially aligned with one corner area of the image sensor 431 (e.g., the corner area between the +Y-directional edge and the +X-directional edge) in the first optical axis direction (e.g., the +Z direction). The bent area B23 may be connected to the side area T23.

The second prong 433B may include a side area T24 extending in a direction (e.g., the −Y direction) substantially orthogonal to each of the first optical axis direction (e.g., the +Z direction) and the extending direction of the side area T23 (e.g., the +X direction) and opposite to the extending direction of the side area T22 (e.g., the +Y direction). The side area T24 may extend along a portion of the perimeter (e.g., the +X-directional edge) of the image sensor 431. The side area T24 may be connected to the bent area B23. The side area T24 may be positioned opposite the side area T22.

The second prong 433B may include a folded area F22 folded in the second optical axis direction (e.g., the −Z direction) opposite to the first optical axis direction (e.g., the +Z direction). The folded area F22 may be an area that is bent at the second angle (e.g., about 45 degrees) less than the first angle outward with respect to the side area T24 and folded at the third angle (e.g., about 180 degrees) greater than the first angle in the second optical axis direction (e.g., the −Z direction). In an embodiment, the folded area F22 may be an area that is bent at the second angle inward with respect to the side area T24 and folded at the third angle in the second optical axis direction (e.g., the −Z direction).

The second prong 433B may include a side area T25 extending substantially in the second optical axis direction (e.g., the −Z direction). The side area T25 may be connected to the folded area F22.

The second prong 433B may include a bent area B24 bent at the first angle (e.g., about 90 degrees) with respect to the second optical axis direction (e.g., the −Z direction) in the outward direction (e.g., the +X direction) of the image sensor 431. The bent area B24 may be an area that is bent toward the connector 432.

The second prong 433B may include a base area T26 connecting the bent area B24 and the connector 432. The base area T26 and the connector 432 may be substantially on the same plane. The base area T26 may be a single area integrated with the base area T16. The base area T26 may be connected to a partial area (e.g., the bent area B14) of the first prong 433A. In an embodiment, the bent area B24 may be directly connected to the connector 432 without the base area T26. In an embodiment, the base area T16 and the base area T26 may be distinguished and separated from each other.

The folded area F11, the folded area F12, the folded area F21, and the folded area F22 may each have a curvature that does not cause a crack. For example, the folded area F11, the folded area F12, the folded area F21, and the folded area F22 may each have a radius of curvature of about 1 mm. The radius of curvature of each of the folded areas may vary depending on the shape of the FPCB, the type of the camera module, or other design parameters.

The first prong 433A and the second prong 433B may be substantially symmetrical with respect to a plane (e.g., the XZ plane) which includes the first optical axis direction (e.g., the +Z direction) and is substantially orthogonal to the plane (e.g., the XY plane) on which the image sensor 431 is placed. For example, the side area T12 and the side area T22 may extend in opposite directions, the side area T13 and the side area T23 may be substantially parallel to each other, and the side area T14 and the side area T24 may extend in opposite directions.

The connecting assembly 430 may include an FPCB 433 including various combinations of a first prong 433A and a second prong 433B. For example, a combination of one of inward folding and outward folding of the folded area F11, one of inward folding and outward folding of the folded area F21, one of inward folding and outward folding of the folded area F12, and one of inward folding and outward folding of the folded area F22 may be possible.

In an embodiment, the FPCB 433 may include only one of the first prong 433A and the second prong 433B.

The bent area B11, the bent area B21, the bent area B14, and the bent area B24 may enable a design that causes areas (e.g., the side area T12, the side area T22, the side area T13, the side area T23, the side area T14, and the side area T24) of the FPCB 433 that may be moved with force received to be positioned on a plane different from the plane on which the image sensor 431 and/or the connector 432 are placed. This may increase the arrangement efficiency of the connecting assembly 430 and reduce the size of a module (e.g., the camera module 400 of FIGS. 5 to 7) accordingly.

The areas (e.g., the side area T12, the side area T22, the side area T13, the side area T23, the side area T14, and the side area T24) of the FPCB 433 on the plane different from the plane on which the image sensor 431 and/or the connector 432 are placed may achieve desired displacement with reduced driving force, which may reduce the power required for driving.

The FPCB 433 including a plurality of bent areas may have a reduced elastic coefficient, which may distribute force to the plurality of areas of the FPCB 433 and thereby reduce the power required for driving.

The connecting assembly 430 may include a plurality of reinforcing portions 434. The reinforcing portions 434 may cause the stiffness of areas of the FPCB 433 to which the reinforcing portions 434 are applied to be greater than the stiffness of areas of the FPCB 433 to which the reinforcing portions 434 are not applied. For example, the plurality of reinforcing portions 434 may be applied to the bent area B11, the bent area B21, the bent area B12, the bent area B23, the bent area B14, and the bent area B24. At least one area (e.g., the side area T12 and the side area T13) of the FPCB 433 positioned near the bent area (e.g., the bent area B12) of the FPCB 433 to which the reinforcing portions 434 are applied may be displaced (e.g., displaced on the XY plane).

Figure 10:
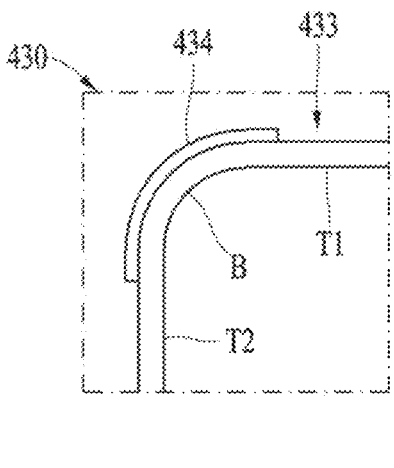
FIG. 10 is a view illustrating a bent area of a flexible printed circuit board (FPCB), according to an embodiment.
Figure 10:
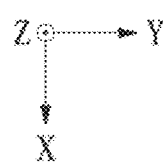

FIG. 10 is a view illustrating a bent area of an FPCB according to an embodiment.

Referring to FIG. 10, the connecting assembly 430 may include an FPCB 433. The FPCB 433 may include a first side area T1 extending in a first direction (e.g., the +/−Y direction), a second side area T2 extending in a second direction (e.g., the +/−X direction) different from (e.g., substantially orthogonal to) the first direction, and a bent area B connecting the first side area T1 and the second side area T2 and bent with respect to the first side area T1 and the second side area T2. The first side area T1, the second side area T2, and the bent area B may be applied to the side areas described with reference to FIGS. 8 and 9 and the bent area therebetween.

The connecting assembly 430 may include a reinforcing portion 434. The reinforcing portion 434 may increase the stiffness of the bent area B to be greater than the stiffness of another area (e.g., the first side area T1 and/or the second side area T2). The reinforcing portion 434 may include a material having a stiffness greater than the stiffness of the FPCB 433. The reinforcing portion 434 may be fixed to the outer side surface of the bent area B by any suitable bonding means (e.g., double-sided tape). The reinforcing portion 434 may cause the configuration of the FPCB 433 to change consistently.

In an embodiment in which the FPCB 433 includes a plurality of bent areas B, the reinforcing portion 434 may be applied to at least a portion of the plurality of bent areas B. For example, referring to FIGS. 8 and 9, the reinforcing portion 434 may be applied to a bent area B11, a bent area B21, a bent area B12, and a bent area B23. Side areas on both sides of the bent area to which the reinforcing portion 434 is applied may be displaced or shifted based on the bent area therebetween. In an embodiment, a larger number of reinforcing portions 434 may be applied to the bent areas if it does not affect the tension of the FPCB 433 beyond the desired range.

In an embodiment, increasing the stiffness of the bent area B may also be achieved by another structure without the reinforcing portion 434. For example, a portion of the housing 420 touching the bent area B (e.g., an inner corner area of the enclosure 420B) may guide and support the bent area B.

Figure 11:
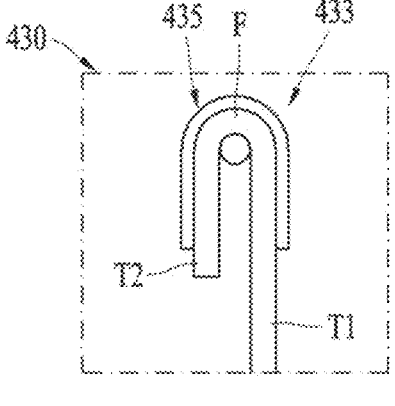
FIG. 11 is a view illustrating a folded area of an FPCB, according to an embodiment.
Figure 11:
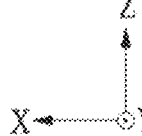

FIG. 11 is a view illustrating a folded area of an FPCB according to an embodiment.

Referring to FIG. 11, the connecting assembly 430 may include an FPCB 433. The FPCB 433 may include a first side area T1 extending in a first direction (e.g., the +/−Z direction), a second side area T2 extending in a second direction (e.g., the +/−Y direction) different from (e.g., substantially orthogonal to) the first direction, and a folded area F connecting the first side area T1 and the second side area T2 and bent with respect to the first side area T1 and the second side area T2. The folded area F may be applied to the folded area (e.g., F11, F12, F21, and/or F22) described with reference to FIGS. 8 and 9.

The connecting assembly 430 may include a fixing portion 435 configured to maintain the shape of the folded area F. The fixing portion 435 may include a multi-step shape surrounding the inner side surface and/or outer side surface of the folded area F. For example, the fixing portion 435 may include a clip.

In an embodiment, the connecting assembly 430 may include bonding. The bonding may be applied to the inner side surface of the folded area F. While the folded area F of the FPCB 433 is fixed by any suitable fixing means, the bonding may be hardened to maintain the shape of the folded area F. Once the bonding is hardened, the fixing means may be removed.

Figure 12:
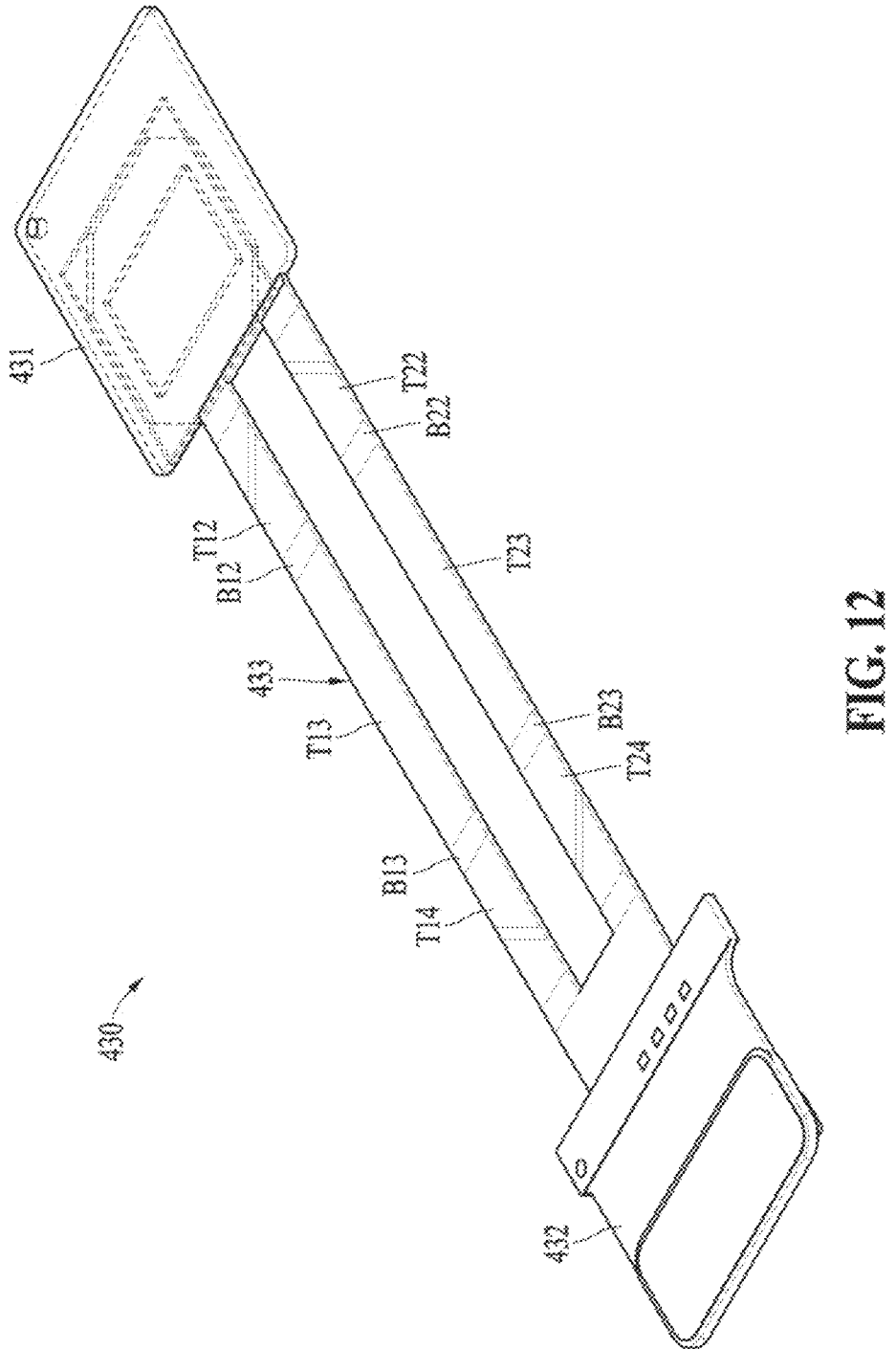
FIG. 12 is a perspective view of a connecting assembly before a portion of an FPCB is bent/folded, according to an embodiment.
Figure 13:
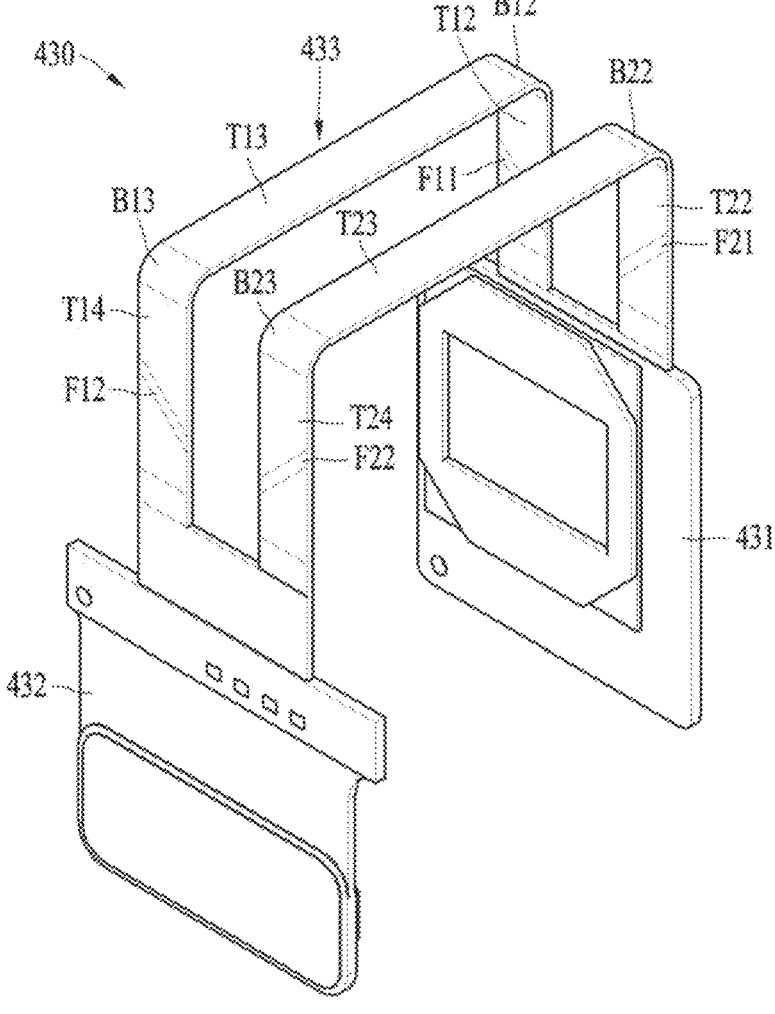
FIG. 13 is a perspective view of the connecting assembly of FIG. 12, in a state in which a portion of the FPCB is bent in the connecting assembly, according to an embodiment.
Figure 14:
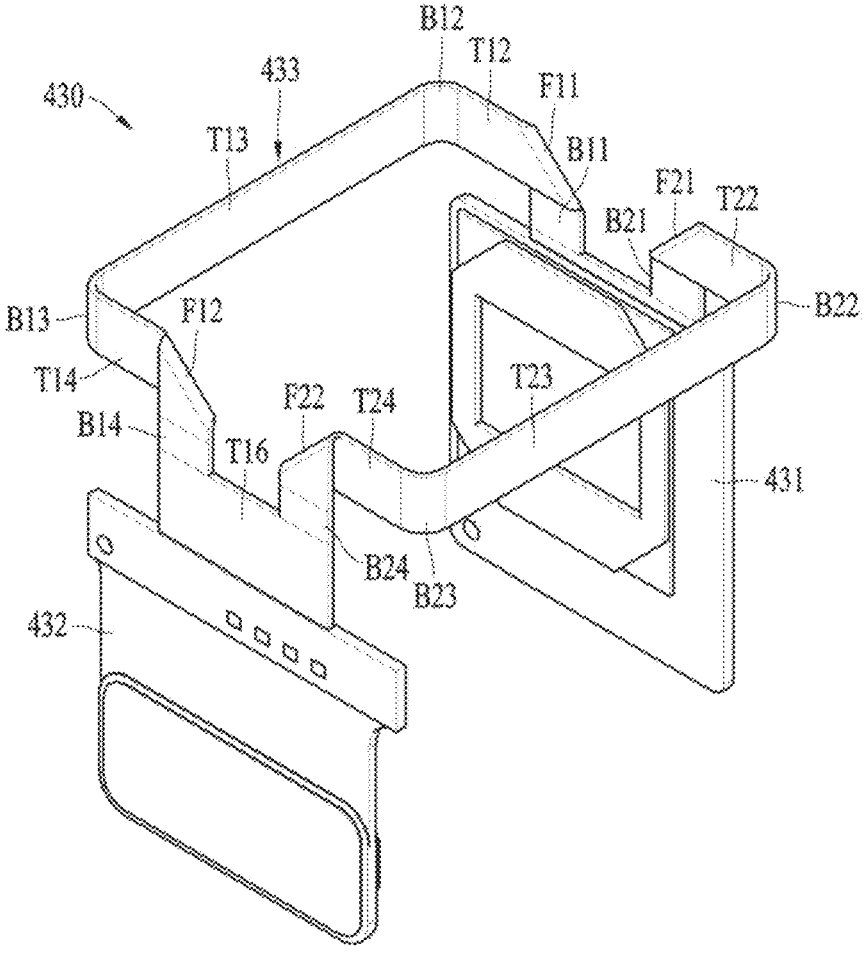
FIG. 14 is a perspective view of the connecting assembly of FIG. 13, in a state in which a portion of the FPCB is bent/folded in the connecting assembly, according to an embodiment.
Figure 15:
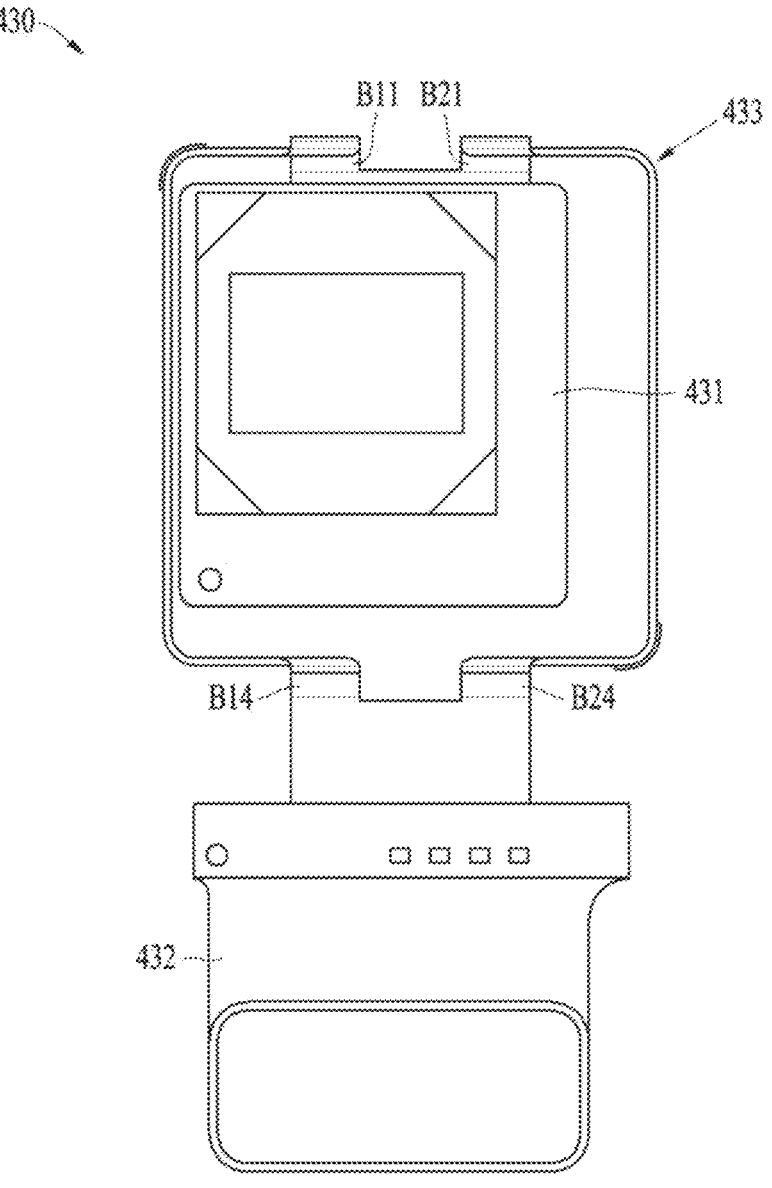
FIG. 15 is a plan view of the connecting assembly of FIG. 14, in a state in which a portion of the FPCB is bent, according to an embodiment.

FIG. 12 is a perspective view of a connecting assembly before a portion of an FPCB is bent/folded according to an embodiment. FIG. 13 is a perspective view of the connecting assembly of FIG. 12, in a state in which a portion of the FPCB is bent in the connecting assembly, according to an embodiment. FIG. 14 is a perspective view of the connecting assembly of FIG. 13, in a state in which a portion of the FPCB is bent/folded in the connecting assembly, according to an embodiment. FIG. 15 is a plan view of the connecting assembly of FIG. 14, in a state in which a portion of the FPCB is bent, according to an embodiment.

The connecting assembly 430 shown in FIG. 12 may transition to the connecting assembly 430 of FIG. 13, by bending (e.g., bending about 90 degrees) as the side area T12 with respect to the side area T13 based on the bent area B12 of the FPCB 433, by bending (e.g., bending about 90 degrees) the side area T14 with respect to the side area T13 based on the bent area B13 of the FPCB 433, by bending (e.g., bending about 90 degrees) the side area T22 with respect to the side area T23 based on the bent area B22 of the FPCB 433, and by bending (e.g., bending about 90 degrees) the side area T24 with respect to the side area T23 based on the bent area B23 of the FPCB 433, so that the image sensor 431 and the connector 432 may face each other.

The connecting assembly 430 shown in FIG. 13 may transition to the connecting assembly 430 of FIG. 14, by folding (e.g., bending about 45 degrees and then folding about 180 degrees) the side area T12 and the side area T14 inward based on the folded area F11 and the folded area F12 of the FPCB 433, respectively, and by folding (e.g., bending about 45 degrees and then folding about 180 degrees) the side area T22 and the side area T24 based on the folded area F21 and the folded area F22 of the FPCB 433, respectively.

The connecting assembly 430 shown in FIG. 14 may transition to the connecting assembly 430 of FIG. 15, by bending (e.g., bending about 90 degrees) the image sensor

431 based on the bent area B11 and the bent area B21 of the FPCB 433, and by bending (e.g., bending about 90 degrees) the connector 432 or the base area T16 connected thereto based on the bent area B14 and the bent area B24 of the FPCB 433.

Figure 16:
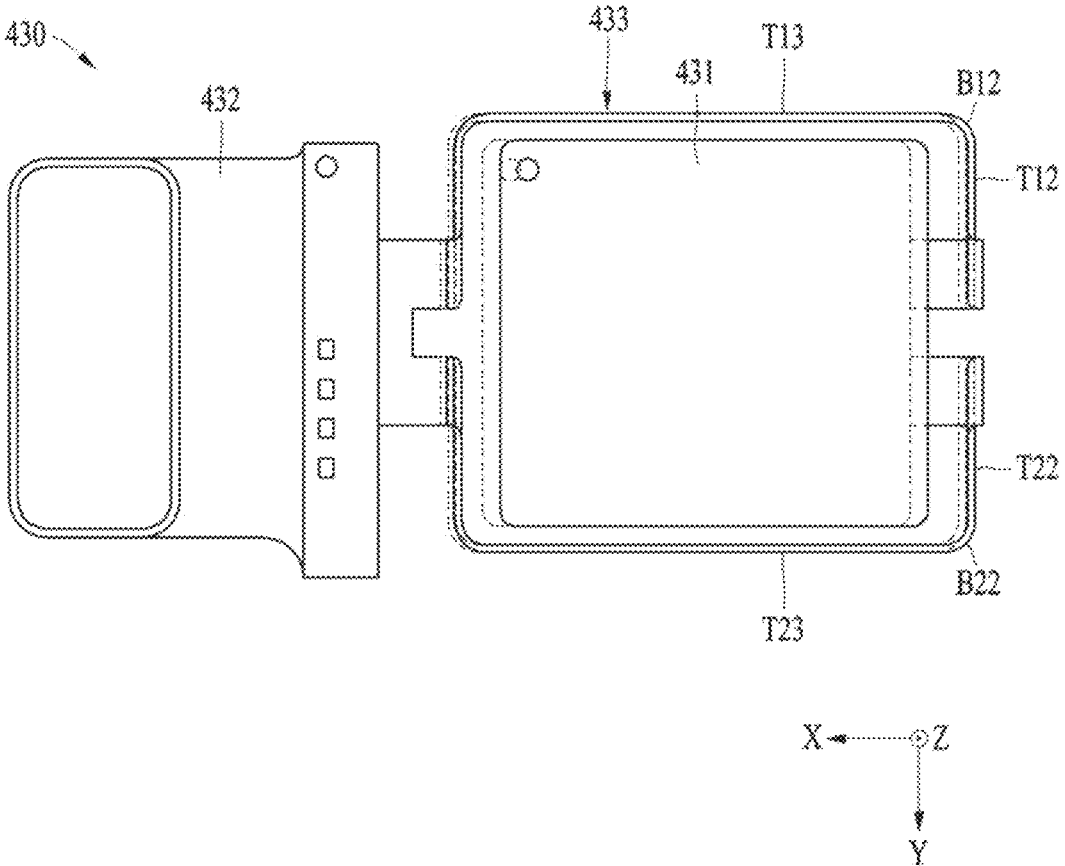
FIG. 16 is a plan view of a connecting assembly in which an FPCB is displaced in one direction, according to an embodiment.
Figure 17:
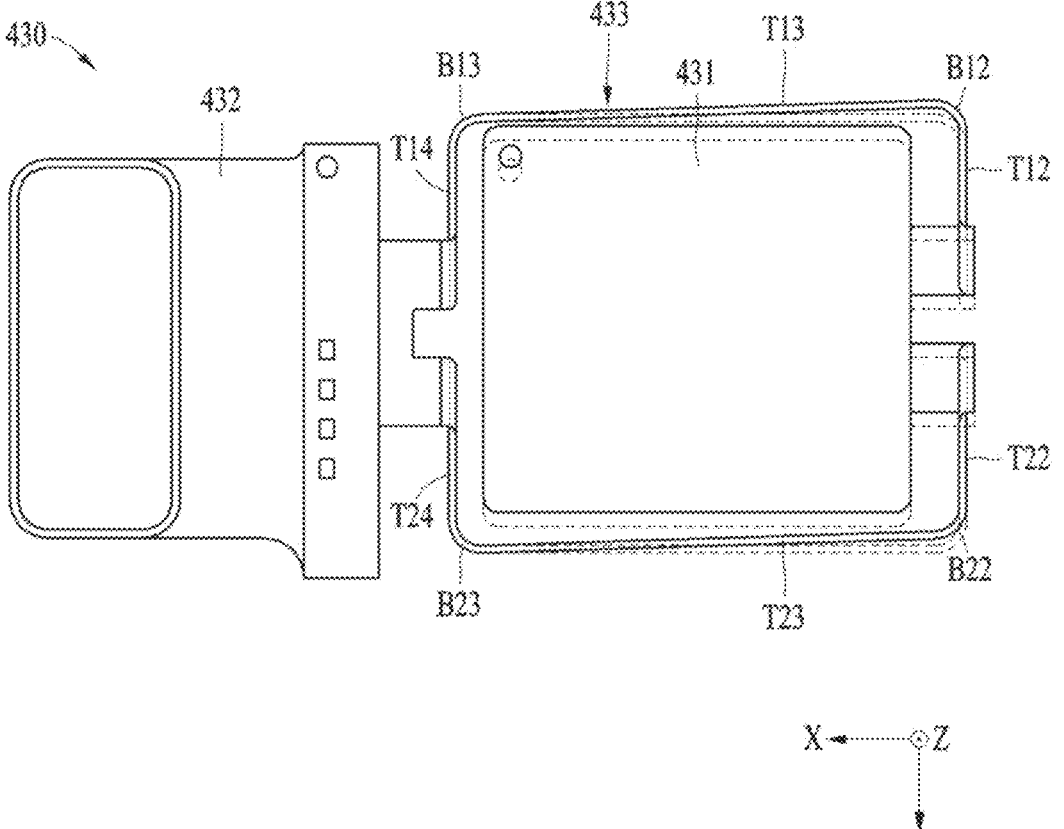
FIG. 17 is a plan view of a connecting assembly in which an FPCB is displaced in another direction, according to an embodiment.

FIG. 16 is a plan view of a connecting assembly in which an FPCB is displaced in one direction according to an embodiment. FIG. 17 is a plan view of a connecting assembly in which an FPCB is displaced in another direction according to an embodiment.

Referring to FIG. 16, the connector 432 in the connecting assembly 430 may maintain a fixed state. When force in the −X direction is applied to the +/−X-directional side areas T12 and/or T22 among the side areas of the FPCB 433 (e.g., by an external force or the actuator 440 described with reference to FIGS. 5 to 7), the side areas T12 and T13 may receive force moving in the −X direction, and the side areas T12 and T22 may be deflected with respect to the side areas T13 and T23 based on the bent areas B12 and B22, respectively, and the image sensor 431 may be shifted in the −X direction. Similarly, the image sensor 431 may be shifted in the +X direction when force in the +X direction is applied to the +/−X-directional side areas T12 and/or T22.

Referring to FIG. 17, the connector 432 in the connecting assembly 430 may maintain a fixed state. When force in the −Y direction is applied to the +/−Y-directional side areas T13 and/or T23 among the side areas of the FPCB 433 (e.g., by an external force or the actuator 440 described with reference to FIGS. 5 to 7), the side areas T13 and T23 may receive force moving in the −Y direction, and the side areas T13 and T23 may be deflected with respect to the side areas T14 and T24 based on the bent areas B13 and B23, respectively, and the image sensor 431 may be shifted in the −Y direction. Similarly, the image sensor 431 may be shifted in the +Y direction when force in the +Y direction is applied to the +/−Y-directional side areas T13 and/or T23.

As described with reference to FIGS. 16 and 17, applying force to the side areas T12, T22, T13, and/or T23 may reduce the repulsive force of the FPCB 433.

Figure 18:
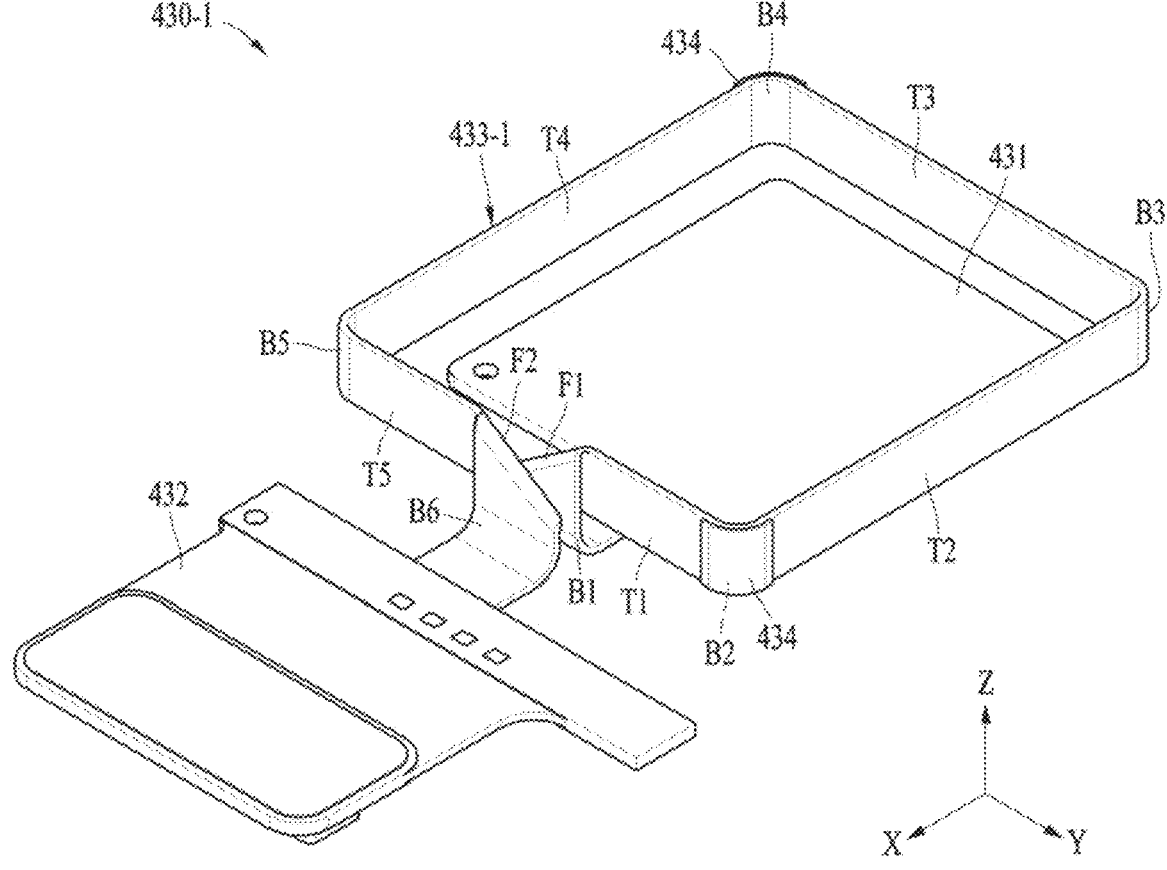
FIG. 18 is a perspective view of a connecting assembly, according to an embodiment.

FIG. 18 is a perspective view of a connecting assembly according to an embodiment.

Referring to FIG. 18, a connecting assembly 430-1 (e.g., the connecting assembly 430 of FIGS. 5 to 15) may include the image sensor 431, the connector 432, and an FPCB 433-1 (e.g., the FPCB 433 of FIGS. 5 to 15). The FPCB 433-1 may be formed of a single prong.

The FPCB 433-1 may include a bent area B1 (e.g., the bent area B11 and/or the bent area B21 of FIGS. 8 and 9) bent at a first angle (e.g., about 90 degrees) in the first optical axis direction (e.g., the +Z direction) with respect to the image sensor 431.

The FPCB 433-1 may include a folded area F1 (e.g., the folded area F11 and/or the folded area F21 of FIGS. 8 and 9) folded in one direction (e.g., the +Y direction) substantially orthogonal to the first optical axis direction (e.g., the +Z direction). The folded area F1 may be an area that is bent at a second angle (e.g., about 45 degrees) less than the first angle with respect to the bent area B1 and folded at a third angle (e.g., about 180 degrees) greater than the first angle in one direction (e.g., the +Y direction). The folded area F1 may be an area that is folded inward in the direction toward the image sensor 431. In an embodiment, the folded area F1 may be an area that is folded outward in a direction away from the image sensor 431.

The FPCB 433-1 may include a side area T1 (e.g., the side area T12 and/or the side area T22 of FIGS. 8 and 9) extending in one direction (e.g., the +Y direction) substantially orthogonal to the first optical axis direction (e.g., the +Z direction). The side area T1 may extend along a portion of the perimeter (e.g., the +X-directional edge) of the image sensor 431. The side area T1 may be connected to the folded area F1.

The FPCB 433-1 may include a bent area B2 (e.g., the bent area B12 and/or the bent area B22 of FIGS. 8 and 9) bent in a direction (e.g., the −X direction) substantially orthogonal to each of the first optical axis direction (e.g., the +Z direction) and the extending direction of the side area T1 (e.g., the +Y direction). The bent area B2 may be an area that is bent at a first angle (e.g., about 90 degrees) with respect to the side area T1. The bent area B2 may be connected to the side area T1.

The FPCB 433-1 may include a side area T2 (e.g., the side area T13 and/or the side area T23 of FIGS. 8 and 9) extending in a direction (e.g., the −X direction) substantially orthogonal to each of the first optical axis direction (e.g., the +Z direction) and the extending direction of the side area T1 (e.g., the +Y direction). The side area T2 may extend along a portion of the perimeter (e.g., the +Y-directional edge) of the image sensor 431. The side area T2 may be connected to the bent area B2.

The FPCB 433-1 may include a bent area B3 (e.g., the bent area B13 and/or the bent area B23 of FIGS. 8 and 9) bent in a direction (e.g., the −Y direction) orthogonal to each of the first optical axis direction (e.g., the +Z direction) and the extending direction of the side area T2 (e.g., the −X direction). The bent area B3 may be an area that is bent at the first angle (e.g., about 90 degrees) with respect to the side area T2. The bent area B3 may be connected to the side area T2.

The FPCB 433-1 may include a side area T3 (e.g., the side area T14 and/or the side area T24 of FIGS. 8 and 9) extending in a direction (e.g., the −Y direction) orthogonal to each of the first optical axis direction (e.g., the +Z direction) and the extending direction of the side area T2 (e.g., the −X direction). The side area T3 may extend in a direction (e.g., the −Y direction) opposite to the extending direction of the side area T1 (e.g., the +Y direction). The side area T3 may extend along a portion of the perimeter (e.g., the −X-directional edge) of the image sensor 431. The side area T3 may be connected to the bent area B3. The side area T3 may be positioned opposite the side area T1.

The FPCB 433-1 may include a bent area B4 bent in a direction (e.g., the +X direction) orthogonal to each of the first optical axis direction (e.g., the +Z direction) and the extending direction of the side area T3 (e.g., the −Y direction). The bent area B4 may be an area that is bent at the first angle (e.g., about 90 degrees) with respect to the side area T3. The bent area B4 may be connected to the side area T3.

The FPCB 433-1 may include a side area T4 extending in a direction (e.g., the +X direction) orthogonal to each of the first optical axis direction (e.g., the +Z direction) and the extending direction of the side area T3 (e.g., the −Y direction). The side area T4 may extend in a direction (e.g., the +X direction) opposite to the extending direction of the side area T2 (e.g., the −X direction). The side area T4 may extend along a portion of the perimeter (e.g., the −Y-directional edge) of the image sensor 431. The side area T4 may be connected to the bent area B4.

The FPCB 433-1 may include a bent area B5 bent in a direction (e.g., the +Y direction) orthogonal to each of the first optical axis direction (e.g., the +Z direction) and the extending direction of the side area T4 (e.g., the +X direction). The bent area B5 may be an area that is bent at the first angle (e.g., about 90 degrees) with respect to the side area T4. The bent area B5 may be connected to the side area T4.

The FPCB 433-1 may include a side area T5 extending in a direction (e.g., the +Y direction) orthogonal to each of the first optical axis direction (e.g., the +Z direction) and the extending direction of the side area T4 (e.g., the +X direction). The side area T5 may extend in a direction (e.g., the +Y direction) opposite to the extending direction of the side area T3 (e.g., the −Y direction). The side area T5 may extend along a portion of the perimeter (e.g., the +X-directional edge) of the image sensor 431. The side area T5 may be connected to the bent area B5. The side area T5 may at least partially overlap the side area T1 in one direction (e.g., the X direction). In an embodiment, the side area T5 may not overlap the side area T1.

The FPCB 433-1 may include a folded area F2 (e.g., the folded area F12 and/or the folded area F22 of FIGS. 8 and 9) folded in a second optical axis direction (e.g., the −Z direction) opposite to the first optical axis direction (e.g., the +Z direction). The folded area F2 may be an area that is bent at a second angle (e.g., about 45 degrees) less than the first angle with respect to the side area T5 and folded at a third angle (e.g., about 180 degrees) greater than the first angle in one direction (e.g., the −Y direction). The folded area F2 may be an area that is folded outward in a direction away from the image sensor 431. In an embodiment, the folded area F2 may be an area that is folded inward in the direction toward the image sensor 431.

The FPCB 433-1 may include a bent area B6 (e.g., the bent area B14 and/or the bent area B24 of FIGS. 8 and 9) bent toward the connector 432 at the first angle (e.g., about 90 degrees) with respect to the second optical axis direction (e.g., the −Z direction).

The image sensor 431 and the connector 432 may be on different planes. In an embodiment, the image sensor 431 and the connector 432 may be substantially on the same plane.

The connecting assembly 430-1 may include a plurality of reinforcing portions 434. Any one of the plurality of reinforcing portions 434 may be positioned on one surface (e.g., an outer surface) of the bent area B2, and the other one thereof may be positioned on one surface (e.g., an outer surface) of the bent area B4. Side areas (e.g., T1 and T2 and/or T3 and T4) on both sides of a bent area (e.g., B2 and B4) in which a reinforcing portion is positioned may be displaced or shifted with respect to the bent area.

Figure 19:
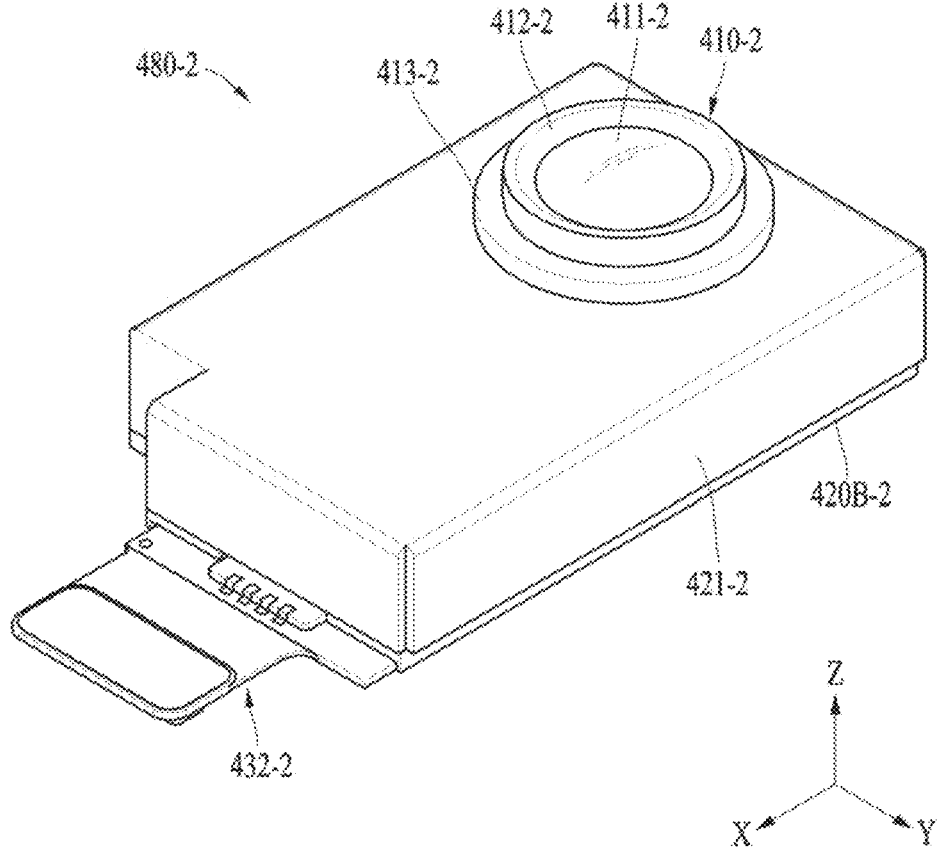
FIG. 19 is a perspective view of a camera module, according to an embodiment.
Figure 20:
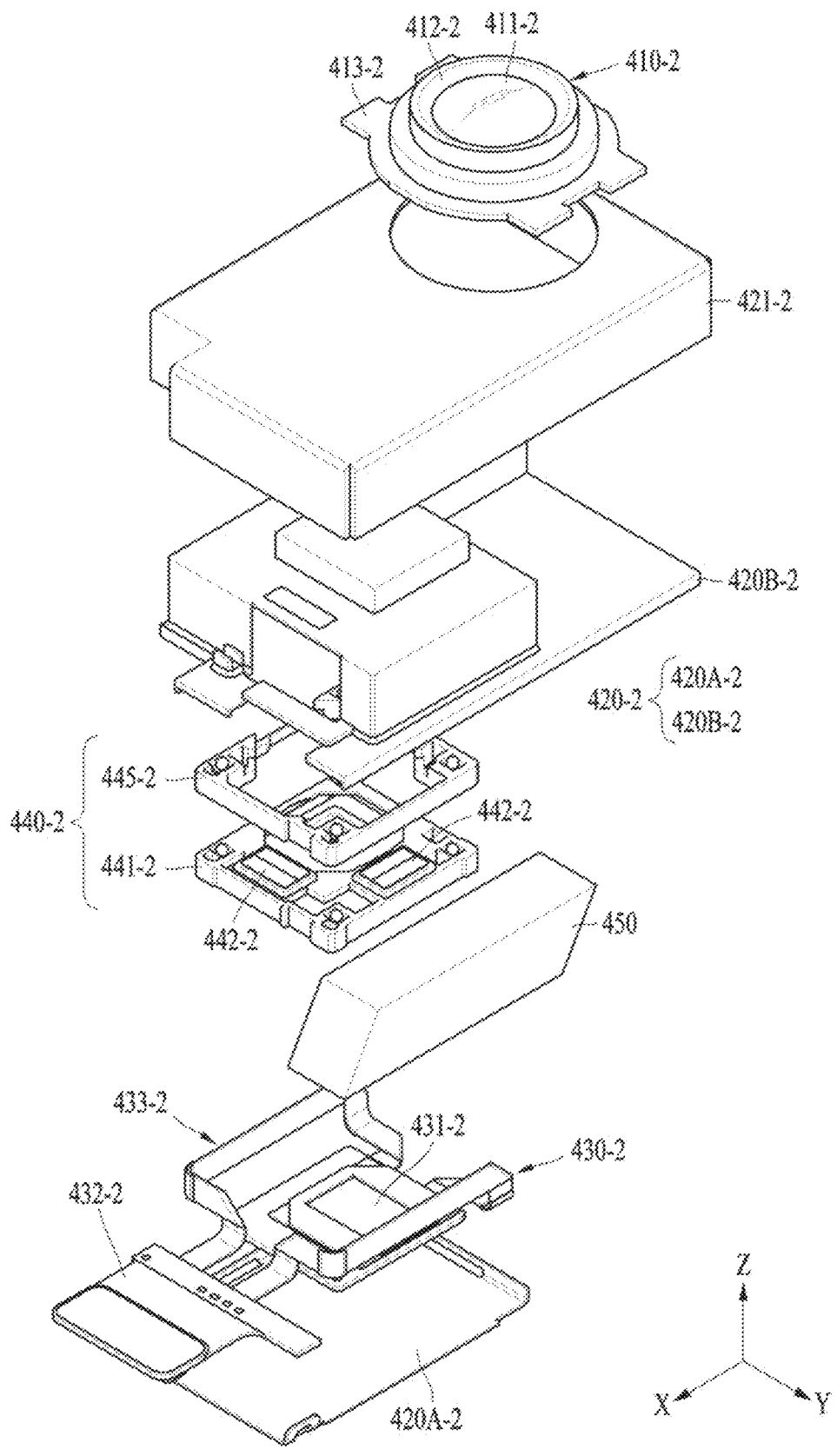
FIG. 20 is an exploded perspective view of a camera module, according to an embodiment.
Figure 21:
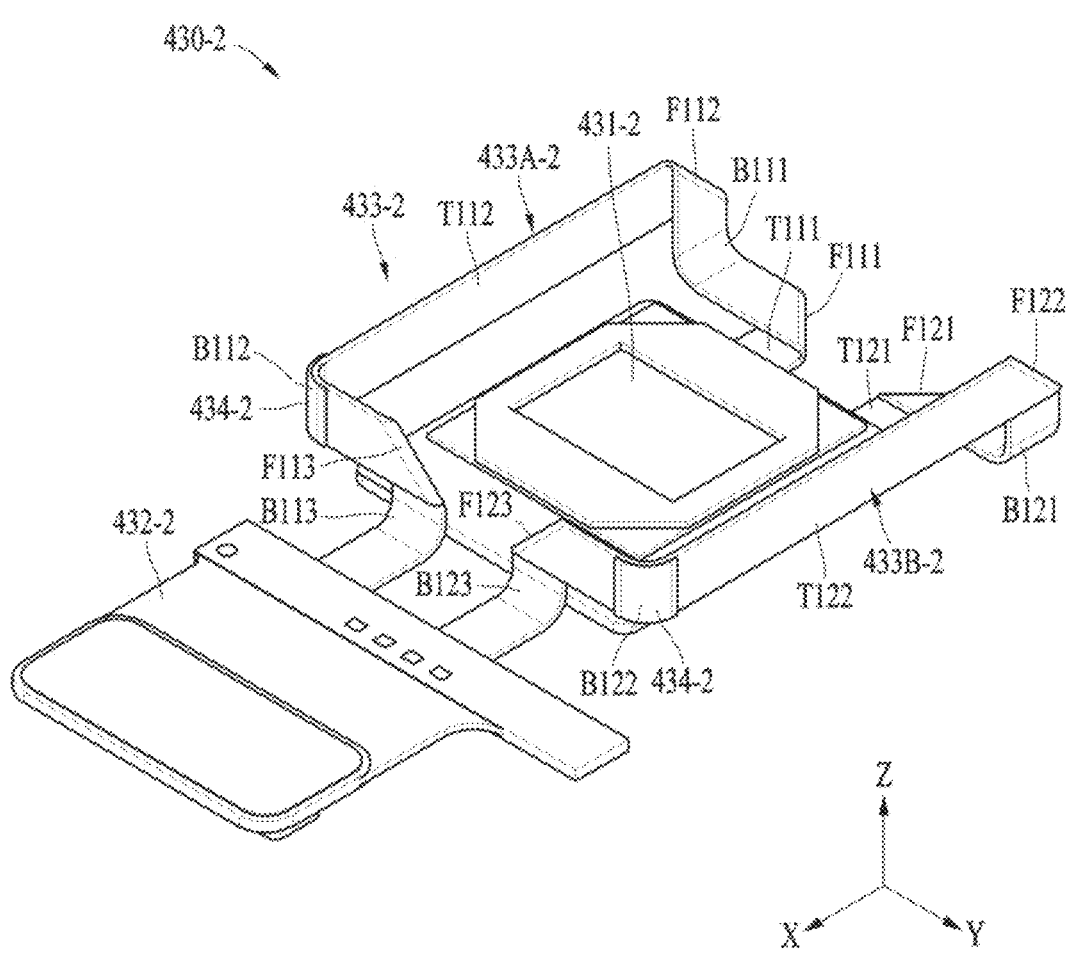
FIG. 21 is a perspective view of a connecting assembly according to an embodiment.
Figure 22:
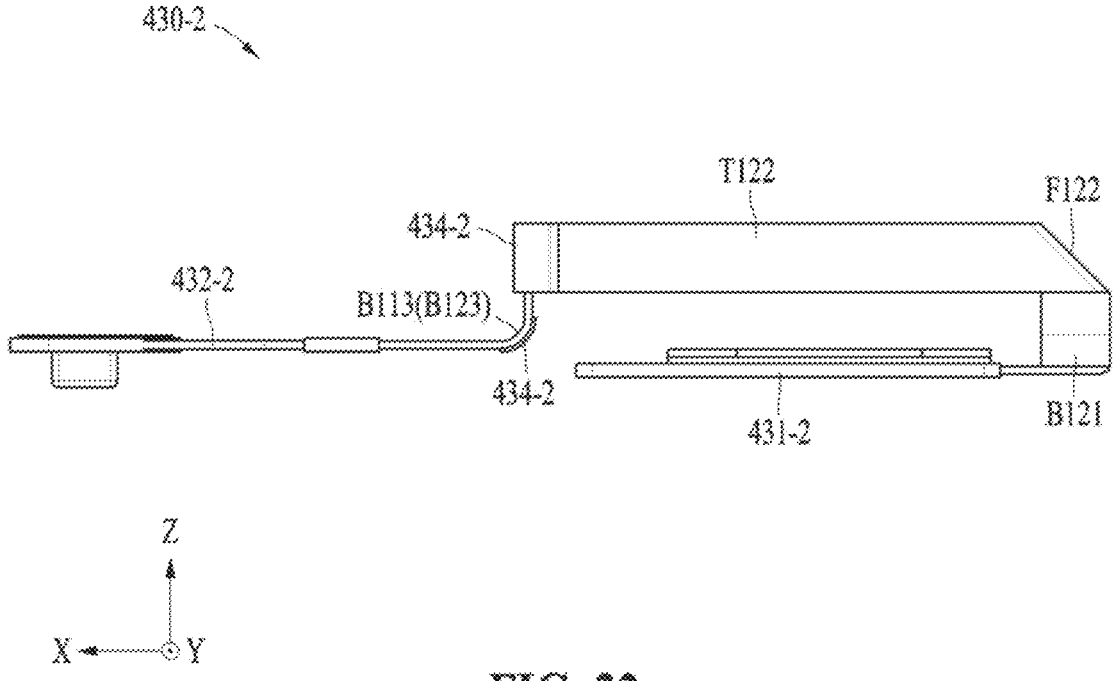
FIG. 22 is a side view of a connecting assembly, according to an embodiment.

FIG. 19 is a perspective view of a camera module according to an embodiment. FIG. 20 is an exploded perspective view of the camera module according to an embodiment. FIG. 21 is a perspective view of a connecting assembly according to an embodiment. FIG. 22 is a side view of the connecting assembly according to an embodiment.

Referring to FIGS. 19 to 22, a camera module 480-2 (e.g., the camera module 180 of FIG. 1, the camera module 180 of FIG. 2, the first camera module 380A, the second camera module 380B, and/or the third camera module 380D of FIGS. 3 and 4, and/or the camera module 400 of FIGS. 5 to 7) may include a lens assembly 410-2 (e.g., the lens assembly 210 of FIG. 2 and/or the lens assembly 410 of FIGS. 5 to 7). The lens assembly 410-2 may include at least one lens 411-2 (e.g., the lens 411 of FIGS. 5 to 7). The lens assembly 410-2 may include a lens housing 412-2 (e.g., the lens housing 412 of FIGS. 5 to 7). The lens assembly 410-2 may include a lens holder 413-2 configured to hold the lens housing 412-2.

The camera module 480-2 may include a camera housing 420-2 (e.g., the camera housing 420 of FIGS. 5 to 7). The camera housing 420-2 may include a base plate 420A-2 (e.g., the base plate 420A of FIGS. 5 to 7), and an enclosure 420B-2 (e.g., the enclosure 420B of FIGS. 5 to 7). The camera module 480-2 may include a camera cover 421-2 (e.g., the camera cover 421 of FIGS. 5 to 7).

The camera module 480-2 may include a connecting assembly 430-2 (e.g., the connecting assembly 430 of FIGS. 5 to 17 and/or the connecting assembly 430-1 of FIG. 18). The connecting assembly 430-2 may include an image sensor 431-2 (e.g., the image sensor 431 of FIGS. 5 to 17 and/or the image sensor 431 of FIG. 18), a connector 432-2 (e.g., the connector 432 of FIGS. 5 to 17 and/or the connector 432 of FIG. 18), and an FPCB 433-2 (e.g., the FPCB 433 of FIGS. 5 to 17 and/or the FPCB 433-1 of FIG. 18).

The FPCB 433-2 may include a first prong 433A-2 (e.g., the first prong 433A of FIGS. 8 and 9) and a second prong 433B-2 (e.g., the second prong 433B of FIGS. 8 and 9). In an embodiment, the FPCB 433-2 may include a single prong. For example, the FPCB 433-2 may include any one of the first prong 433A-2 and the second prong 433B-2, or may include a single prong as in the FPCB 433-1 of FIG. 18.

The first prong 433A-2 may include a base area T111 substantially on the same plane as the image sensor 431. The base area T111 may be connected to a portion of one edge (e.g., the −X-directional edge) of the image sensor 431.

The first prong 433A-2 may include a folded area F111 folded in one direction (e.g., the −Y direction) with respect to the image sensor 431. The folded area F111 may be an area that is bent inward at one angle (e.g., about 45 degrees) with respect to the base area T111 and folded at another angle (e.g., about 180 degrees) in one direction (e.g., the −Y direction). In an embodiment, the folded area F111 may be an area that is bent outward at one angle (e.g., about 45 degrees) with respect to the base area T111 and folded at another angle (e.g., about 180 degrees) in one direction (e.g., the −Y direction). The folded area F111 may be connected to the base area T111. In an embodiment, the folded area F111 may be connected to the image sensor 431-2 without the base area T111.

The first prong 433A-2 may include a bent area B111 bent in a direction (e.g., the +Z direction) substantially orthogonal to the folding direction of the folded area F111 (e.g., the −Y direction). The bent area B111 may be an area that is bent at one angle (e.g., about 90 degrees) with respect to the folded area F111. The bent area B111 may be directly connected to the folded area F111. In an embodiment, there may be an additional base area between the bent area B111 and the folded area F111.

The first prong 433A-2 may include a folded area F112 folded in a direction (e.g., the +X direction) substantially orthogonal to each of the folding direction of the folded area F111 (e.g., in the −Y direction) and the bending direction of the bent area B111 (e.g., the +Z direction). The folded area F112 may be an area that is bent outward at one angle (e.g., about 45 degrees) with respect to the bent area B111 and folded at another angle (e.g., about 180 degrees) in one direction (e.g., the +X direction). In an embodiment, the folded area F112 may be an area that is bent inward at one angle (e.g., about 45 degrees) with respect to the bent area B111 and folded at another angle (e.g., about 180 degrees) in one direction (e.g., the −X direction). The folded area F112 may be connected to the bent area B111. In an embodiment, there may be an additional side area between the folded area F112 and the bent area B111.

The first prong 433A-2 may include a side area T112 extending in the folding direction of the folded area F112 (e.g., the +X direction). The side area T112 may extend along a portion of the perimeter (e.g., the −Y-directional edge) of the image sensor 431.

The first prong 433A-2 may include a bent area B112 bent in a direction (e.g., the +Y direction) substantially orthogonal to the extending direction of the side area T112 (e.g., the +X direction). The bent area B112 may be an area that is bent at one angle (e.g., about 90 degrees) with respect to the side area T112.

The first prong 433A-2 may include a folded area F113 folded in a direction (e.g., the −Z direction) substantially orthogonal to each of the folding direction of the folded area F112 (e.g., in the +X direction) and the bending direction of the bent area B112 (e.g., the +Y direction). The folded area F113 may be an area that is bent inward at one angle (e.g., about 45 degrees) with respect to the bent area B112 and folded at another angle (e.g., about 180 degrees) in one direction (e.g., the −Z direction). In an embodiment, the folded area F113 may be an area that is bent outward at one angle (e.g., about 45 degrees) with respect to the bent area B112 and folded at another angle (e.g., about 180 degrees) in one direction (e.g., the −Z direction). There may be an additional side area between the folded area F113 and the bent area B112.

The first prong 433A-2 may include a bent area B113 bent toward the connector 432-2. The bent area B113 may be an area that is bent at one angle (e.g., about 90 degrees) with respect to the folded area F113. The bent area B113 may be connected to the folded area F113 and the connector 432-2.

The second prong 433B-2 may include a base area T121 substantially on the same plane as the image sensor 431. The base area T121 may be connected to a portion of one edge (e.g., the −X-directional edge) of the image sensor 431. The base area T121 may be separated from the base area T111 along an edge (e.g., the −X-directional edge) of the image sensor 431. In an embodiment, the base area T121 may be integrated with the base area T111.

The second prong 433B-2 may include a folded area F121 folded in one direction (e.g., the +Y direction) with respect to the image sensor 431. The folded area F121 may be an area that is bent inward at one angle (e.g., about 45 degrees) with respect to the base area T121 and folded at another angle (e.g., about 180 degrees) in one direction (e.g., the +Y direction). In an embodiment, the folded area F121 may be an area that is bent outward at one angle (e.g., about 45 degrees) with respect to the base area T121 and folded at another angle (e.g., about 180 degrees) in one direction (e.g., the +Y direction). The folded area F121 may be connected to the base area T121. In an embodiment, the folded area F121 may be connected to the image sensor 431-2 without the base area T121.

The second prong 433B-2 may include a bent area B121 bent in a direction (e.g., the +Z direction) substantially orthogonal to the folding direction of the folded area F121 (e.g., the +Y direction). The bent area B121 may be an area that is bent at one angle (e.g., about 90 degrees) with respect to the folded area F121. The bent area B121 may be directly connected to the folded area F121. In an embodiment, there may be an additional base area between the bent area B121 and the folded area F121.

The second prong 433B-2 may include a folded area F122 folded in a direction (e.g., the +X direction) substantially orthogonal to each of the folding direction of the folded area F121 (e.g., in the +Y direction) and the bending direction of the bent area B121 (e.g., the +Z direction). The folded area F122 may be an area that is bent outward at one angle (e.g., about 45 degrees) with respect to the bent area B121 and folded at another angle (e.g., about 180 degrees) in one direction (e.g., the +X direction). In an embodiment, the folded area F122 may be an area that is bent inward at one angle (e.g., about 45 degrees) with respect to the bent area B121 and folded at another angle (e.g., about 180 degrees) in one direction (e.g., the +X direction). The folded area F122 may be connected to the bent area B121. In an embodiment, there may be an additional side area between the folded area F122 and the bent area B121.

The second prong 433B-2 may include a side area T122 extending in the folding direction of the folded area F122 (e.g., the +X direction). The side area T122 may extend along a portion of the perimeter (e.g., the +Y-directional edge) of the image sensor 431.

The second prong 433B-2 may include a bent area B122 bent in a direction (e.g., the −Y direction) substantially orthogonal to the extending direction of the side area T122 (e.g., the +X direction). The bent area B122 may be an area that is bent at one angle (e.g., about 90 degrees) with respect to the side area T122.

The second prong 433B-2 may include a folded area F123 folded in a direction (e.g., the −Z direction) substantially orthogonal to each of the folding direction of the folded area F122 (e.g., in the +X direction) and the bending direction of the bent area B122 (e.g., the −Z direction). The folded area F123 may be an area that is bent inward at one angle (e.g., about 45 degrees) with respect to the bent area B122 and folded at another angle (e.g., about 180 degrees) in one direction (e.g., the −Z direction). In an embodiment, the folded area F123 may be an area that is bent outward at one angle (e.g., about 45 degrees) with respect to the bent area B122 and folded at another angle (e.g., about 180 degrees) in one direction (e.g., the −Z direction). There may be an additional side area between the folded area F123 and the bent area B122.

The second prong 433B-2 may include a bent area B123 bent toward the connector 432-2. The bent area B123 may be an area that is bent at one angle (e.g., about 90 degrees) with respect to the folded area F123. The bent area B123 may be connected to the folded area F123 and the connector 432-2. The bent area B123 may be separated from the bent area B113. In an embodiment, the bent area B123 may be integrated with the bent area B113 into one, or may be connected to an additional base area connected to the connector 432-2.

The first prong 433A-2 and the second prong 433B-2 may be substantially symmetrical with respect to a plane (e.g., the XZ plane) that is substantially orthogonal to the plane (e.g., the XY plane) on which the image sensor 431 is placed.

The FPCB 433-2 may include at least one reinforcing portion 434-2 (e.g., the reinforcing portions 434 of FIGS. 8 to 10). The reinforcing portion 434-2 may be applied to an outer surface and/or inner surface of the bent area B112, the bent area B122, the bent area B113, and/or the bent area B123. In an embodiment, alternatively or additionally, the camera housing 420-2 may be configured to guide and support the outer surface and/or inner surface of the bent area B112, the bent area B122, the bent area B113, and/or the bent area B123.

The camera module 480-2 may include an actuator 440-2 (e.g., the actuator 440 of FIGS. 5 to 7). The actuator 440-2 may include a carrier 441-2 (e.g., the carrier 441 of FIGS. 5 to 7), at least one first electromagnetic element 442-2 (e.g., the magnets 442A and 442B of FIGS. 5 to 7), at least one second electromagnetic element (e.g., the coils 443A and 443B of FIGS. 5 to 7), and a middle guide 445-2 (e.g., the middle guide 445 of FIGS. 5 to 7).

The camera module 480-2 may include a reflector 450 configured to reflect light passing through the lens 411-2 toward the image sensor 431-2. For example, the reflector 450 may include a rhomboidal prism, but is not limited thereto, and may be configured as an optical system including a mirror. The optical axis may be defined as a line that connects the center of curvature of one surface (e.g., the +Z-directional surface) of the lens 411-2 and the center of curvature of another surface (e.g., the −Z-directional surface) thereof, passes through an incidence surface of the reflector 450, is reflected by a reflective surface of the reflector 450, and passes through an exit surface of the reflector 450.

The reflector 450 may be surrounded by at least a partial area of the FPCB 433-2. The base area T111, the base area T121, the folded area F111, and the folded area F121 of the FPCB 433-2 may face a base surface (e.g., the −Z-directional surface) of the reflector 450. The folded area F112, the folded area F122, part of the side area T112, and part of the side area T122 of the FPCB 433-2 may face a side surface (e.g., the +/−Y-directional surface) of the reflector 450. The folded area F113 and the folded area F123 of the FPCB 433-2 may face a rear surface (e.g., the +X-directional surface) of the reflector 450.

One aspect of the disclosure may provide a camera module including an FPCB driven with low power. One aspect of the disclosure may provide an electronic device including the camera module.

A camera module 400; 400-2 may include a lens 411; 411-2 having an optical axis OA, a lens housing 412; 412-2 configured to accommodate the lens 411; 411-2, an image sensor 431; 431-2 configured to receive light passing through the lens 411; 411-2, a connector 432; 432-2 configured to receive an electrical signal from the image sensor 431; 431-2, and an FPCB 433; 433-1; 433-2 configured to connect the image sensor 431; 431-2 and the connector 432; 432-2. The FPCB 433; 433-1; 433-2 may be configured to change a configuration between a first configuration in which the FPCB 433; 433-1; 433-2 extends substantially linearly between the image sensor 431; 431-2 and the connector 432; 432-2 and a second configuration in which the FPCB 433; 433-1; 433-2 has at least three bent areas, at least two folded areas, and at least two side areas along a perimeter of the image sensor.

The FPCB 433; 433-1; 433-2 may include a first bent area B11, B21; B1; B111, B121 connected to the image sensor 431; 431-2 and bent in a first direction (+Z) with respect to the image sensor 431; 431-2, a first folded area F11, F21; F1; F112, F122 folded in a second direction (−Y, +Y; +Y; +X) substantially orthogonal to the first direction (+Z) with respect to the first bent area B11, B21; B1; B111, B121, a first side area T12, T22; T1; T112, T122 connected to the first folded area F11, F21; F1; F112, F122 and extending in the second direction (−Y, +Y; +Y; +X) along the perimeter of the image sensor 431; 431-2, a second bent area B12, B22; B2; B112, B122 connected to the first side area T12, T22; T1; T112, T122 and bent in a third direction (+X; −X; +Y, −Y) substantially orthogonal to each of the first direction (+Z) and the second direction (−Y, +Y; +Y; +X), a second side area T13, T23; T2 connected to the second bent area B12, B22; B2; B112, B122 and extending in the third direction (+X; −X; +Y, −Y) along the perimeter of the image sensor 431; 431-2, a second folded area F12, F22; F2; F113, F123 connected to the second side area T13, T23; T2 and folded in a fourth direction (−Z) opposite to the first direction (+Z), and a third bent area B14, B24; B6; B113, B123 connected to the second folded area F12, F22; F2; F113, F123, bent toward the connector 432; 432-2, and connected to the connector 432; 432-2.

The first side area T12, T22; T1; T112, T122 and the second side area T13, T23; T2 may be on a plane different from the plane on which the image sensor 431; 431-2 is positioned.

The camera module 400; 400-2 may include an actuator 440; 440-2 configured to apply a force to the first side area T12, T22; T1; T112, T122 and/or the second side area T13, T23; T2.

The FPCB 433; 433-1 may include a fourth bent area B13, B23; B3 connected to the second side area T13, T23 and bent in a fifth direction (+Y, −Y; −Y) opposite to the second direction (−Y, +Y; +Y), and a third side area T14, T24; T3 connected to the fourth bent area B13, B23; B3 and the second folded area F12, F22; F2; F113, F123 and extending in the fifth direction (+Y, −Y; −Y) along the perimeter of the image sensor 431; 431-2.

The FPCB 433; 433-2 may include a first FPCB 433A; 433A-2 and a second FPCB 433B; 433B-2.

The first FPCB 433A; 433A-2 and the second FPCB 433B; 433B-2 may be symmetrically arranged relative to each other with respect to a plane (XZ) including the optical axis OA.

The FPCB 433; 433-1; 433-2 may include a first base area connecting the image sensor 431; 431-2 and the first bent area B11, B21; B1; B111, B121. The FPCB 433; 433-1; 433-2 may include a second base area T16, T26 connecting the third bent area B14, B24; B6; B113, B123 and the connector 432; 432-2.

The first folded area F11, F21; F1; F112, F122 may be folded inward and/or outward, and the second folded area F12, F22; F2; F113, F123 may be folded inward and/or outward.

The first folded area F11, F21; F1; F112, F122 and the second folded area F12, F22; F2; F113, F123 may have curvatures that enable folding without cracks in the FPCB 433; 433-1; 433-2.

The FPCB 433; 433-1; 433-2 may include a reinforcing portion 434; 434-2 positioned in at least one of the first bent area B11, B21; B1; B111, B121, the second bent area B12, B22; B2; B112, B122, or the third bent area B14, B24; B6; B113, B123.

The camera module 400; 400-2 may include a camera housing 420; 420-2 configured to support at least one of the first bent area B11, B21; B1; B111, B121, the second bent area B12, B22; B2; B112, B122, or the third bent area B14, B24; B6; B113, B123.

The FPCB 433; 433-1; 433-2 may include a hardened bonding and/or fixing portion 435 positioned in the first folded area F11, F21; F1; F112, F122 and/or the second folded area F12, F22; F2; F113, F123.

The camera module 400; 400-2 may include a carrier 441; 441-2 configured to carry the lens housing 412; 412-2 and positioned between the lens housing 412; 412-2 and the image sensor 431; 431-2.

The FPCB 433-1 may include a fourth bent area B3 connected to the second side area T2 and bent in a fifth direction (−Y) opposite to the second direction (+Y), a third side area T3 connected to the fourth bent area B3 and extending in the fifth direction (−Y) along the perimeter of the image sensor 431, a fifth bent area B4 connected to the third side area T3 and bent in a sixth direction (+X) opposite to the third direction (−X), a fourth side area T4 connected to the fifth bent area B4 and extending in the sixth direction (+X) along the perimeter of the image sensor 431, a sixth bent area B5 connected to the fourth side area T4 and bent in the second direction (+Y), and a fifth side area T5 connected to the sixth bent area B5 and the second folded area F2 and extending in the second direction (+Y).

The fifth side area T5 may at least partially overlap the first side area T1.

The FPCB 433-2 may include a third folded area F111, F121 connected to the image sensor 431-2 and the first bent area B111, B121 and folded in a direction (−Y, +Y) substantially orthogonal to each of the first direction (+Z) and the second direction (+X).

An electronic device 101; 301 may include the camera module 480; 480-2.

A camera module 400; 400-2 may include a lens 411; 411-2 having an optical axis OA, a lens housing 412; 412-2 configured to accommodate the lens 411; 411-2, an image sensor 431; 431-2 configured to receive light passing through the lens 411; 411-2, a connector 432; 432-2 configured to receive an electrical signal from the image sensor 431; 431-2, and an FPCB 433; 433-1; 433-2 configured to connect the image sensor 431; 431-2 and the connector 432; 432-2. The FPCB 433; 433-1; 433-2 may include a first bent area B11, B21; B1; B111, B121 connected to the image sensor 431; 431-2 and bent in a first direction (+Z) with respect to the image sensor 431; 431-2, a first folded area F11, F21; F1; F112, F122 folded in a second direction (−Y, +Y; +Y; +X) substantially orthogonal to the first direction (+Z) with respect to the first bent area B11, B21; B1; B111, B121, a first side area T12, T22; T1; T112, T122 connected to the first folded area F11, F21; F1; F112, F122 and extending in the second direction (−Y, +Y; +Y; +X) along the perimeter of the image sensor 431; 431-2, a second bent area B12, B22; B2; B112, B122 connected to the first side area T12, T22; T1; T112, T122 and bent in a third direction (+X; −X; +Y, −Y) substantially orthogonal to each of the first direction (+Z) and the second direction (−Y, +Y; +Y; +X), a second side area T13, T23; T2 connected to the second bent area B12, B22; B2; B112, B122 and extending in the third direction (+X; −X; +Y, −Y) along the perimeter of the image sensor 431; 431-2, a second folded area F12, F22; F2; F113, F123 connected to the second side area T13, T23; T2 and folded in a fourth direction (−Z) opposite to the first direction (+Z), and a third bent area B14, B24; B6; B113, B123 connected to the second folded area F12, F22; F2; F113, F123, bent toward the connector 432; 432-2, and connected to the connector 432; 432-2.

A camera module 480 may include a lens 411 having an optical axis OA, a lens housing 412 configured to accommodate the lens 411, an image sensor 431 configured to receive light passing through the lens 411, a connector 432 configured to receive an electrical signal from the image sensor 431, and an FPCB 433; 433-1 configured to connect the image sensor 431 and the connector 432. The FPCB 433-1 may include a first bent area B1 connected to the image sensor 431 and bent in a first direction (+Z) with respect to the image sensor 431, a first folded area F1 connected to the first bent area B1 and folded in a second direction (+Y) substantially orthogonal to the first direction (+Z), a first side area T1 connected to the first folded area F1 and extending in the second direction (+Y) along a perimeter of the image sensor 431, a second bent area B2 connected to the first side area T1 and bent in a third direction (−X) substantially orthogonal to each of the first direction (+Z) and the second direction (+Y), a second side area T2 connected to the second bent area B2 and extending in the third direction (−X) along the perimeter of the image sensor 431, a third bent area B3 connected to the second side area T2 and bent in a fourth direction (−Y) opposite to the second direction (+Y), a third side area T3 connected to the third bent area B3 and extending in the fourth direction (−Y) along the perimeter of the image sensor 431, a fourth bent area B4 connected to the third side area T3 and bent in a fifth direction (+X) opposite to the third direction (−X), a fourth side area T4 connected to the fourth bent area B4 and extending in the fifth direction (+X) along the perimeter of the image sensor 431, a fifth bent area B5 connected to the fourth side area T4 and bent in the second direction (+Y), a fifth side area T5 connected to the fifth bent area B5 and extending in the second direction (+Y), a second folded area F2 connected to the fifth side area T5 and folded in a sixth direction (−Z) opposite to the first direction (+Z), and a sixth bent area B6 connected to the second folded area F2, bent toward the connector 432, and connected to the connector 432.

A camera module 480-2 may include a lens 411-2 having an optical axis OA, a lens housing 412-2 configured to accommodate the lens 411-2, an image sensor 431-2 configured to receive light passing through the lens 411-2, a connector 432-2 configured to receive an electrical signal from the image sensor 431-2, and an FPCB 433-2 configured to connect the image sensor 431-2 and the connector 432-2. The FPCB 433-2 may include a first folded area F111; F121 connected to the image sensor 431-2 and folded in a first direction (−Y, +Y) with respect to the image sensor 431-2, a first bent area B111, B121 connected to the first folded area F111; F121 and bent in a second direction (+Z) substantially orthogonal to the first direction (−Y, +Y), a second folded area F112, F122 connected to the first bent area B111, B121 and folded in a third direction (+X) substantially orthogonal to each of the first direction (−Y, +Y) and the second direction (+Z), a side area T112, T122 connected to the second folded area F112, F122 and extending in the third direction (+X) along a perimeter of the image sensor 431-2, a second bent area B112, B122 connected to the side area T112, T122 and bent in a fourth direction (+Y, −Y) opposite to the first direction (−Y, +Y), a third folded area F113, F123 connected to the second bent area B112, B122 and folded in a fifth direction (−Z) opposite to the second direction (+Z), and a third bent area B113, B123 connected to the third folded area F113, F123, bent toward the connector 423-2, and connected to the connector 423-2.

According to an embodiment, the size (e.g., the X-directional dimension and Y-directional dimensions) of a camera module may be reduced. According to an embodiment, the cost of manufacturing FPCBs may be reduced. According to an embodiment, the elasticity coefficient of an FPCB may be reduced, the repulsive force of the FPCB may be reduced accordingly, and as a result, the FPCB may be driven with low power. According to an embodiment, the height (e.g., the Z-directional dimension) of an actuator may be reduced, and as a result, the size (e.g., the Z-directional dimension) of a camera module may be reduced.

The effects of the camera module and the electronic device including the same according to an embodiment may not be limited to the above-mentioned effects, and other unmentioned effects may be clearly understood from the following description by one of ordinary skill in the art.

The one or more embodiments of the disclosure are intended to be illustrative and not restrictive. Various modifications may be made to the detailed description of the disclosure including the accompanying scope of claims and equivalents. Any of the embodiment(s) described herein may be used in combination with any other embodiment(s) described herein.

33

What is claimed is:

1. A camera module comprising:
a lens comprising an optical axis;
a lens housing configured to accommodate the lens;
an image sensor configured to receive light passing through the lens;
a connector configured to receive an electrical signal from the image sensor; and
a flexible printed circuit board (FPCB) configured to connect the image sensor and the connector,
wherein the FPCB is configured to;
change from a first configuration in which the FPCB is configured to extend substantially linearly between the image sensor and the connector, into a second configuration in which the FPCB has at least three bent areas, at least two folded areas, and at least two side areas along a perimeter of the image sensor; and
change from the second configuration into the first configuration.

2. The camera module of claim 1, wherein the FPCB comprises:
a first bent area connected to the image sensor and configured to bend in a first direction with respect to the image sensor;
a first folded area configured to fold in a second direction that is substantially orthogonal to the first direction with respect to the first bent area;
a first side area connected to the first folded area and configured to extend in the second direction along the perimeter of the image sensor;
a second bent area connected to the first side area and configured to bend in a third direction that is substantially orthogonal to each of the first direction and the second direction;
a second side area connected to the second bent area and configured to extend in the third direction along the perimeter of the image sensor;
a second folded area connected to the second side area and configured to fold in a fourth direction that is opposite to the first direction; and
a third bent area connected to the second folded area, the third bent area being configured to bend toward the connector, and configured to connect to the connector.

3. The camera module of claim 2, wherein the first side area and the second side area are on a plane that is different from the plane on which the image sensor is provided.

4. The camera module of claim 3, further comprising:
an actuator configured to apply a force to the first side area and/or the second side area.

5. The camera module of claim 4, wherein the FPCB further comprises:
a fourth bent area connected to the second side area and is configured to bend in a fifth direction that is opposite to the second direction; and
a third side area connected to the fourth bent area and the second folded area, and configured to extend in the fifth direction along the perimeter of the image sensor.

6. The camera module of claim 1, wherein the FPCB comprises a first FPCB and a second FPCB, and the first FPCB and the second FPCB are symmetrically arranged relative to each other with respect to a plane comprising the optical axis.

7. The camera module of claim 2, wherein the FPCB further comprises:
a first base area configured to connect the image sensor and the first bent area; and/or

34 a second base area configured to connect the third bent area and the connector.

8. The camera module of claim 2, wherein the first folded area is configured to fold inward and/or outward, and the second folded area is configured to fold inward and/or outward.

9. The camera module of claim 8, wherein the first folded area and the second folded area have curvatures configured to fold without cracking the FPCB.

10. The camera module of claim 2, wherein the FPCB further comprises a reinforcing portion provided in at least one of the first bent area, the second bent area, or the third bent area.

11. The camera module of claim 10, further comprising:
a camera housing configured to support at least one of the first bent area, the second bent area, or the third bent area.

12. The camera module of claim 11, wherein the FPCB further comprises a hardened bonding and/or a fixing portion provided in the first folded area or the second folded area.

13. The camera module of claim 1, further comprising:
a carrier configured to carry the lens housing, the carrier being provided between the lens housing and the image sensor.

14. The camera module of claim 2, wherein the FPCB further comprises:
a fourth bent area configured to connect to the second side area and configured to bend in a fifth direction that is opposite to the second direction;
a third side area configured to connect to the fourth bent area and configured to extend in the fifth direction along the perimeter of the image sensor;
a fifth bent area configured to connect to the third side area and configured to bend in a sixth direction that is opposite to the third direction;
a fourth side area configured to connect to the fifth bent area and configured to extend in the sixth direction along the perimeter of the image sensor;
a sixth bent area configured to connect to the fourth side area and configured to bend in the second direction; and
a fifth side area configured to connect to the sixth bent area and the second folded area and configured to extend in the second direction.

15. The camera module of claim 14, wherein the fifth side area at least partially overlaps the first side area.

16. The camera module of claim 2, wherein the FPCB further comprises a third folded area configured to connect to the image sensor and the first bent area and configured to fold in a direction that is substantially orthogonal to each of the first direction and the second direction.

17. An electronic device comprising the camera module of claim 1.

18. A camera module comprising:
a lens comprising an optical axis;
a lens housing configured to accommodate the lens;
an image sensor configured to receive light passing through the lens;
a connector configured to receive an electrical signal from the image sensor; and
a flexible printed circuit board (FPCB) configured to connect the image sensor and the connector, wherein the FPCB comprises:
a first bent area configured to connect to the image sensor and configured to bend in a first direction with respect to the image sensor;

a first folded area configured to fold in a second direction that is substantially orthogonal to the first direction with respect to the first bent area;

a first side area configured to connect to the first folded area and configured to extend in the second direction along a perimeter of the image sensor;

a second bent area configured to connect to the first side area and configured to bend in a third direction that is substantially orthogonal to each of the first direction and the second direction;

a second side area configured to connect to the second bent area and configured to extend in the third direction along the perimeter of the image sensor;

a second folded area configured to connect to the second side area and configured to fold in a fourth direction that is opposite to the first direction; and a third bent area configured to connect to the second folded area, the third bent area being configured to bend toward the connector, and configured to connect to the connector.

19. A camera module comprising:

a lens comprising an optical axis;

a lens housing configured to accommodate the lens;

an image sensor configured to receive light passing through the lens;

a connector configured to receive an electrical signal from the image sensor; and a flexible printed circuit board (FPCB) configured to connect the image sensor and the connector, wherein the FPCB comprises:

a first bent area configured to connect to the image sensor and configured to be bent in a first direction with respect to the image sensor;

a first folded area configured to connect to the first bent area and configured to fold in a second direction that is substantially orthogonal to the first direction;

a first side area configured to connect to the first folded area and configured to extend in the second direction along a perimeter of the image sensor;

a second bent area configured to connect to the first side area and configured to bend in a third direction that is substantially orthogonal to each of the first direction and the second direction;

a second side area configured to connect to the second bent area and configured to extend in the third direction along the perimeter of the image sensor;

a third bent area configured to connect to the second side area and configured to bend in a fourth direction that is opposite to the second direction;

a third side area configured to connect to the third bent area and configured to extend in the fourth direction along the perimeter of the image sensor;

a fourth bent area configured to connect to the third side area and configured to bend in a fifth direction that is opposite to the third direction;

a fourth side area configured to connect to the fourth bent area and configured to extend in the fifth direction along the perimeter of the image sensor;

a fifth bent area configured to connect to the fourth side area and configured to bend in the second direction;

a fifth side area configured to connect to the fifth bent area and configured to extend in the second direction;

a second folded area configured to connect to the fifth side area and configured to fold in a sixth direction that is opposite to the first direction; and a sixth bent area configured to connect to the second folded area, the sixth bent area being configured to bend toward the connector, and configured to connect to the connector.

20. A camera module comprising:

a lens comprising an optical axis;

a lens housing configured to accommodate the lens;

an image sensor configured to receive light passing through the lens;

a connector configured to receive an electrical signal from the image sensor; and a flexible printed circuit board (FPCB) configured to connect the image sensor and the connector, wherein the FPCB comprises:

a first folded area configured to connect to the image sensor and configured to fold in a first direction with respect to the image sensor;

a first bent area configured to connect to the first folded area and configured to bend in a second direction that is substantially orthogonal to the first direction;

a second folded area configured to connect to the first bent area and configured to fold in a third direction that is substantially orthogonal to each of the first direction and the second direction;

a side area configured to connect to the second folded area and configured to extend in the third direction along a perimeter of the image sensor;

a second bent area configured to connect to the side area and configured to bend in a fourth direction that is opposite to the first direction;

a third folded area configured to connect to the second bent area and configured to fold in a fifth direction that is opposite to the second direction; and a third bent area configured to connect to the third folded area, the third bent area configured to bend toward the connector, and configured to connect to the connector.

* * * * *